US012631845B2

(12) United States Patent
Hsu et al.

(10) Patent No.: US 12,631,845 B2
(45) Date of Patent: May 19, 2026

(54) IMAGING LENS ASSEMBLY, CAMERA MODULE AND ELECTRONIC DEVICE

(71) Applicant: LARGAN PRECISION CO., LTD., Taichung (TW)

(72) Inventors: Chih-Wen Hsu, Taichung (TW); Heng-Yi Su, Taichung (TW); Chun-Jui Pan, Taichung (TW); Ming-Ta Chou, Taichung (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 489 days.

(21) Appl. No.: 18/187,060

(22) Filed: Mar. 21, 2023

(65) Prior Publication Data

US 2023/0358992 A1     Nov. 9, 2023

(30) Foreign Application Priority Data

May 6, 2022     (TW) .................................. 111117224

(51) Int. Cl.
| | |
|---|---|
| *G03B 30/00* | (2021.01) |
| *G02B 5/00* | (2006.01) |
| *G02B 7/02* | (2021.01) |
| *G03B 9/02* | (2021.01) |

(52) U.S. Cl.
CPC ............. *G02B 7/021* (2013.01); *G02B 5/005* (2013.01); *G03B 9/02* (2013.01); *G03B 30/00* (2021.01)

(58) Field of Classification Search
CPC ........... G02B 5/005; G03B 9/02; G03B 11/04
USPC ....................................................... 359/611
See application file for complete search history.

(56) References Cited

U.S. PATENT DOCUMENTS

| | | | | |
|---|---|---|---|---|
| 4,810,076 | A | * | 3/1989 | Murao ................... G02B 5/005 |
| | | | | 359/227 |
| 7,419,315 | B2 | | 9/2008 | Hirata |
| 9,400,383 | B2 | | 7/2016 | Liang |
| 10,288,778 | B2 | | 5/2019 | Hsu |
| 2013/0121681 | A1 | | 5/2013 | Lee |
| 2018/0196171 | A1 | * | 7/2018 | Hsu ......................... G02B 5/005 |

(Continued)

FOREIGN PATENT DOCUMENTS

| | | | | |
|---|---|---|---|---|
| CN | 207867101 | U | 9/2018 | |
| CN | 110196478 | A | 9/2019 | |
| CN | 111830674 | A | * 10/2020 | ........... G02B 13/004 |

(Continued)

*Primary Examiner* — Ricky L Mack
*Assistant Examiner* — Natasha Nigam
(74) *Attorney, Agent, or Firm* — McClure, Qualey & Rodack, LLP

(57) ABSTRACT

An imaging lens assembly, having an optical axis, includes an imaging lens set and a lens holding member. The lens holding member accommodates the imaging lens set for aligning the imaging lens set with the optical axis. The lens holding member includes a plurality of light-blocking structures, which are disposed on an object side of the imaging lens set and surround the optical axis for forming a light passing hole. Each of the light-blocking structures is a straight-line shape and has two end points and one central point, and the central point is closer to the optical axis than each of the two end points thereto. A maximum radius of the light passing hole is defined by a position near each of the two end points, and a minimum radius thereof is defined by a position near the central point.

19 Claims, 37 Drawing Sheets

(56)        References Cited

U.S. PATENT DOCUMENTS

2019/0324172 A1* 10/2019 Chou ...................... G02B 1/111
2020/0285029 A1     9/2020 Watanabe

FOREIGN PATENT DOCUMENTS

| CN | 112649934 A | 4/2021 |
| CN | 113741117 A | 12/2021 |
| JP | 2008021357 A | 1/2008 |
| JP | 2009086465 A | 4/2009 |
| JP | 2011039463 A | 2/2011 |
| JP | 2017181767 A | 10/2017 |
| JP | 2019164253 A | 9/2019 |
| KR | 20130051638 A | 5/2013 |
| TW | 201825999 A | 7/2018 |

* cited by examiner

100

1101

120

1F

1F

100

120

100

1101

120

1L

1L

100

120

200

200

200

200

220

2201

2101

300

322
321

320

3101
3101
3102
3101
3102
3101
3103
3101
3102
3101
3104
x

IMAGING LENS ASSEMBLY, CAMERA MODULE AND ELECTRONIC DEVICE

RELATED APPLICATIONS

This application claims priority to Taiwan Application Serial Number 111117224, filed May 6, 2022, which is herein incorporated by reference.

BACKGROUND

Technical Field

The present disclosure relates to an imaging lens assembly and a camera module. More particularly, the present disclosure relates to a miniaturized imaging lens assembly and a miniaturized camera module applied to electronic devices.

Description of Related Art

In recent years, portable electronic devices have developed rapidly, such as intelligent electronic devices, tablets, etc., they have been filled in the lives of modern people, and camera modules, imaging lens assemblies and lens elements thereof mounted on the portable electronic devices have also prospered. However, as technology advances, users have higher and higher requirements for the quality of lens elements. Therefore, how to enhance the assembling precision of optical elements has been an important and urgent issue in the industry.

SUMMARY

According to one aspect of the present disclosure, an imaging lens assembly having an optical axis includes an imaging lens set and a lens holding member. The optical axis passes through the imaging lens set. The lens holding member accommodates the imaging lens set for aligning the imaging lens set with the optical axis. The lens holding member includes a plurality of light-blocking structures. The light-blocking structures are disposed on an object side of the imaging lens set and surround the optical axis for forming a light passing hole. Each of the light-blocking structures is a straight-line shape and has two end points and one central point, and the central point is closer to the optical axis than each of the two end points to the optical axis on each of the light-blocking structures. A maximum radius of the light passing hole is defined as Rmax by a position near each of the two end points of each of the light-blocking structures, and a minimum radius of the light passing hole is defined as Rmin by a position near the central point of each of the light-blocking structures, which is closest to the optical axis. When a total number of the light-blocking structures is N, the following condition is satisfied: $3 \leq N < 40$.

According to one aspect of the present disclosure, a camera module includes the imaging lens assembly of the aforementioned aspect.

According to one aspect of the present disclosure, an electronic device includes the camera module of the aforementioned aspect and an image sensor disposed on an image surface of the camera module.

BRIEF DESCRIPTION OF THE DRAWINGS

FIG. 2O is a schematic view of a plurality of light-blocking structures disposed on a lens holding member of an imaging lens assembly of the 3rd example according to the 2nd embodiment of the present disclosure.

FIG. 3I is a three-dimensional view of an imaging lens assembly of the 2nd example according to the 3rd embodiment of the present disclosure.

FIG. 3O is a schematic view of a plurality of light-blocking structures and a plurality of radius structures disposed on a lens holding member of an imaging lens assembly of the 3rd example according to the 3rd embodiment of the present disclosure.

DETAILED DESCRIPTION

Figure 1A:
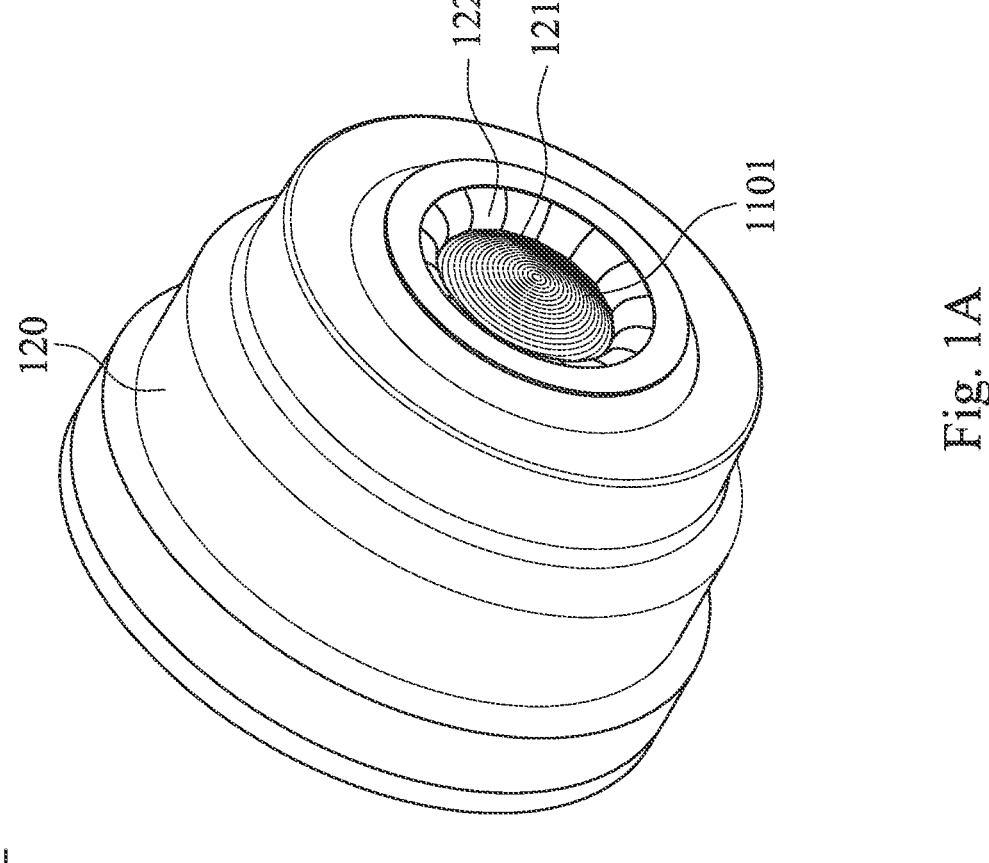
FIG. 1A is a three-dimensional view of an imaging lens assembly of the 1st example according to the 1st embodiment of the present disclosure.

The present disclosure provides an imaging lens assembly, having an optical axis. The imaging lens assembly includes an imaging lens set and a lens holding member. The optical axis passes through the imaging lens set. The lens holding member accommodates the imaging lens set for aligning the imaging lens set with the optical axis. The lens holding member includes a plurality of light-blocking structures. The light-blocking structures are disposed on an object side of the imaging lens set and surround the optical axis for forming a light passing hole. Each of the light-blocking structures is a straight-line (i.e., a linear-line) shape and has two end points and one central point, and the central point is closer to the optical axis than each of the two end points to the optical axis on each of the light-blocking structures. A maximum radius of the light passing hole is defined as Rmax by a position near each of the two end points of each of the light-blocking structures, and a minimum radius of the light passing hole is defined as Rmin by a position near the central point of each of the light-blocking structures, which is closest to the optical axis. When a total number of the light-blocking structures is N, the following condition is satisfied: $3 \leq N < 40$. The generation of flare can be effectively controlled by forming a light-blocking hole through a configuration of the light-blocking structures, thereby improving the image quality.

In detail, two adjacent end points of any adjacent two light-blocking structures, respectively, are connected to each other, so that the light-blocking structures surround the optical axis and form the light passing hole shaped as an N-sided polygon. When the light passing hole is an N-sided polygon, the flare in an image generated by an incident light at a special angle can have a controllable appearance and intensity. Furthermore, the maximum radius of the light passing hole, Rmax, is a circumscribed circle radius of the light passing hole, and the minimum radius of the light passing hole, Rmin, is an inscribed circle radius of the light passing hole.

The lens holding member and the light-blocking structures can be formed integrally. By forming the lens holding member and the light-blocking structures at the same time, the cost of production can be reduced.

There is no contact between the light-blocking structures and the imaging lens set. Therefore, the light-blocking efficiency of the light-blocking structures can be optimized by the proper space configuration.

When a total number of the light-blocking structures is between 7 and 22, and the light passing hole has a circularity tolerance value being t and a circularity coefficient being tc, the following conditions are satisfied: $0.01 < t < 0.08$; and $1.02\% < tc < 9.90\%$, wherein $t = Rmax - Rmin$; and $tc = t/Rmax \times 100\%$. Therefore, a preferred range of a technical feature can be controllable for different shapes of the light passing hole to meet the light-blocking requirement. Furthermore, the following condition can be satisfied: $1.12\% < tc < 8.05\%$. Therefore, a circularity coefficient range with higher flare controllability can be provided.

In detail, the light passing hole can be shaped as an N-sided polygon. Furthermore, the light passing hole can be shaped as a regular polygon. Please refer to Table 1 below, Table 1 lists a number of sides of the regular polygon of the light passing hole and a circularity tolerance value t and a circularity coefficient tc corresponding thereto.

TABLE 1

| Number of sides of the regular polygon | t (mm) | tc |
|---|---|---|
| 3 | 0.4675 | 50.00% |
| 4 | 0.2738 | 29.28% |
| 5 | 0.1786 | 19.10% |
| 7 | 0.0926 | 9.90% |
| 8 | 0.0712 | 7.61% |
| 9 | 0.0564 | 6.03% |
| 10 | 0.0458 | 4.89% |
| 11 | 0.0379 | 4.05% |
| 12 | 0.0319 | 3.41% |
| 13 | 0.0272 | 2.90% |
| 14 | 0.0234 | 2.51% |
| 16 | 0.0180 | 1.92% |
| 20 | 0.0115 | 1.23% |
| 22 | 0.0095 | 1.02% |
| 24 | 0.0080 | 0.85% |
| 28 | 0.0059 | 0.63% |
| 30 | 0.0051 | 0.55% |
| 34 | 0.0040 | 0.43% |
| 35 | 0.0038 | 0.40% |

TABLE 1-continued

| Number of sides of the regular polygon | t (mm) | tc |
|---|---|---|
| 36 | 0.0036 | 0.38% |
| 39 | 0.0030 | 0.32% |
| 40 | 0.0029 | 0.31% |

Moreover, the lens holding member can further include a plurality of radius structures, and each of the radius structures is connected to one of the two end points of an adjacent one of the light-blocking structures. Therefore, it is favorable to control the minimum radius Rmin of the light passing hole not to decrease as the total number of the light-blocking structures decreases, so as to enhance the design margin of the light passing hole. Specifically, a radius of the radius structures is the maximum radius Rmax.

There is an angle being θ between two connecting lines, respectively, from the two end points of each of the light-blocking structures to the optical axis. The minimum radius of the light passing hole defined as Rmin is for defining an equivalent number of the light-blocking structures as N', the light passing hole has a circularity tolerance value being t and a circularity coefficient being tc, and the following conditions are satisfied: N'=360°/θ; 7<N'<22; 0.01<t<0.08; and 1.02%<tc<9.90%, wherein N'≠N, t=Rmax−Rmin, tc=t/Rmax×100%. Therefore, a preferred range of a technical feature can be controllable for different shapes of the light passing hole to meet the light-blocking requirement. Furthermore, the following condition can be satisfied: 1.12%<tc<8.05%.

Each of the light-blocking structures can be formed by connecting and intersecting a first tapered surface and a second tapered surface. By cooperating with a preferred mold design way, the difficulty of releasing the lens holding member can be decreased, so as to enhance the yield. Furthermore, the first tapered surface faces toward an object side of the imaging lens assembly and tapers toward an image side of the imaging lens assembly, and the second tapered surface faces toward the image side of the imaging lens assembly and tapers toward the object side of the imaging lens assembly. With a preferred design way of tapered surfaces, it is ensured that the light-blocking structures are disposed on an ideal light-blocking position.

Each of the light-blocking structures overlaps with the imaging lens set along a direction parallel to the optical axis. Therefore, the light-blocking efficiency of the light-blocking structures can be optimized by the proper space configuration.

The light passing hole can be an aperture of the imaging lens assembly for controlling an amount of incident light of the imaging lens assembly.

Therefore, the required light-blocking position of a front aperture of the imaging lens assembly can be met, so as to improve the optical design margin.

When a focal length of the imaging lens assembly is EFL, the following condition is satisfied: 1.0<EFL/(2×Rmin)<3.0. Therefore, it can be ensured that there is sufficient light entering, so as to maintain the image quality. Furthermore, when the light passing hole is the aperture of the imaging lens assembly, an f-number Fno of the imaging lens assembly is equal to EFL/(2×Rmin).

The lens holding member can have at least two gate marks. Therefore, the lens holding member with a more complex configuration can be corresponded, so as to enhance mold design margin. Furthermore, a number of the gate marks of the lens holding member can be at least three.

The present disclosure provides a camera module, which includes the imaging lens assembly of the aforementioned aspect. Therefore, a better image quality can be provided.

The present disclosure provides an electronic device, which includes the camera module of the aforementioned aspect and an image sensor, wherein the image sensor is disposed on an image surface of the camera module. Therefore, the image quality can be improved. Preferably, the electronic device can further include a control unit, a display, a storage unit, a random access memory unit (RAM), or a combination thereof.

According to the aspects as mentioned above, specific embodiments and examples are proposed below and described in detail with the drawings.

1st Embodiment

Figure 1B:
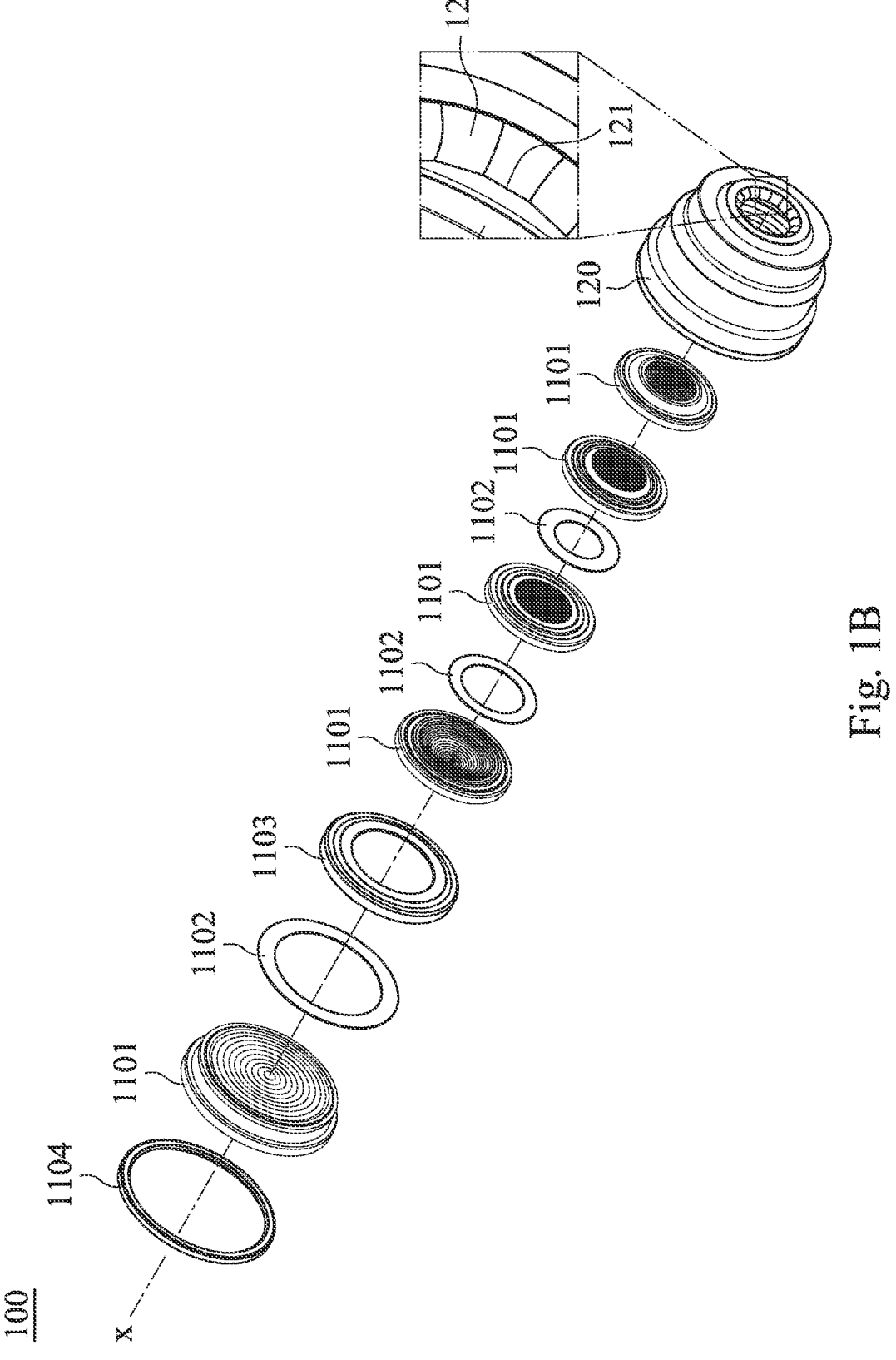
FIG. 1B is an exploded view of the imaging lens assembly in FIG. 1A.
Figure 1C:
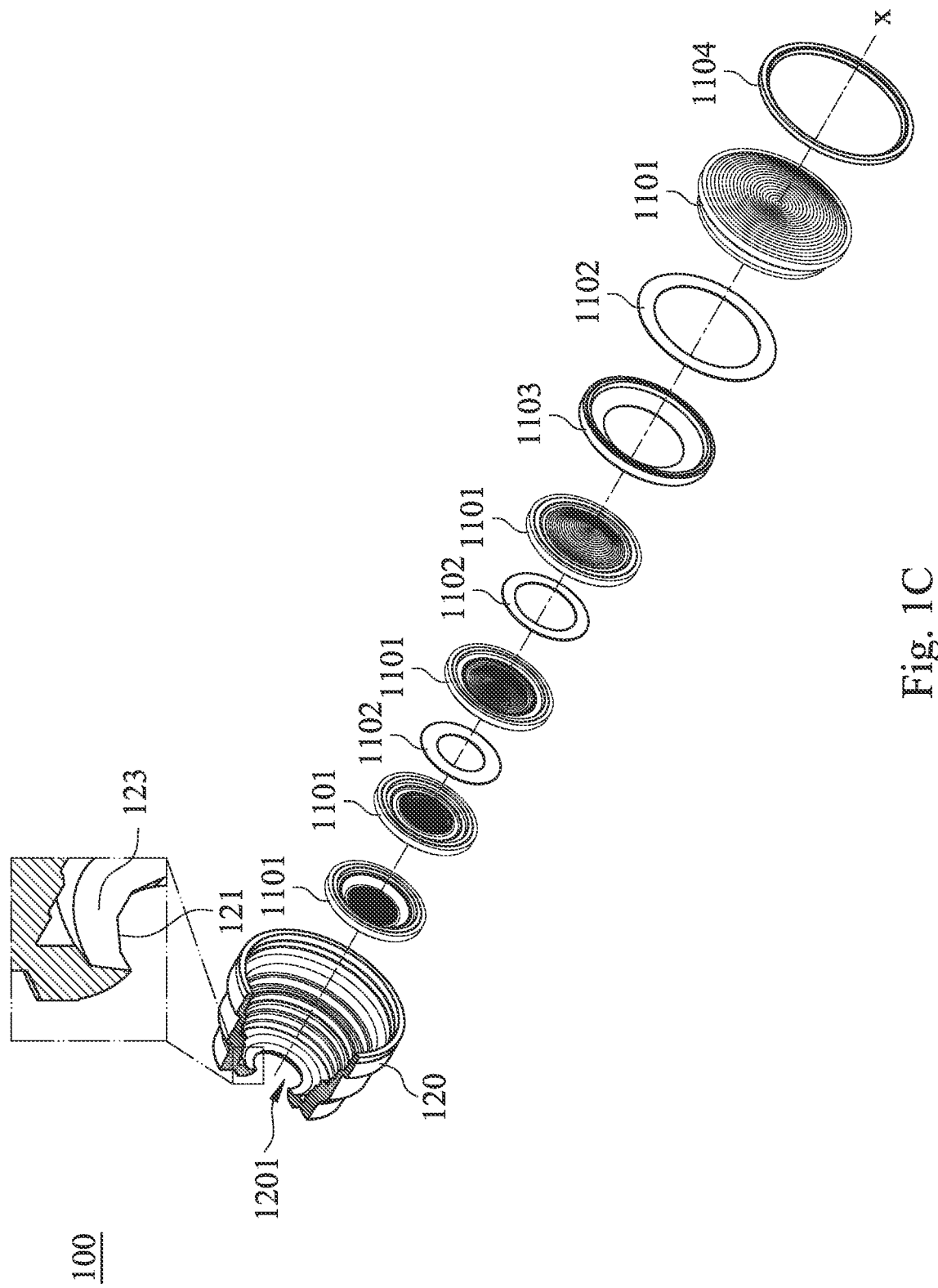
FIG. 1C is another exploded view of the imaging lens assembly in FIG. 1A.
Figure 1E:
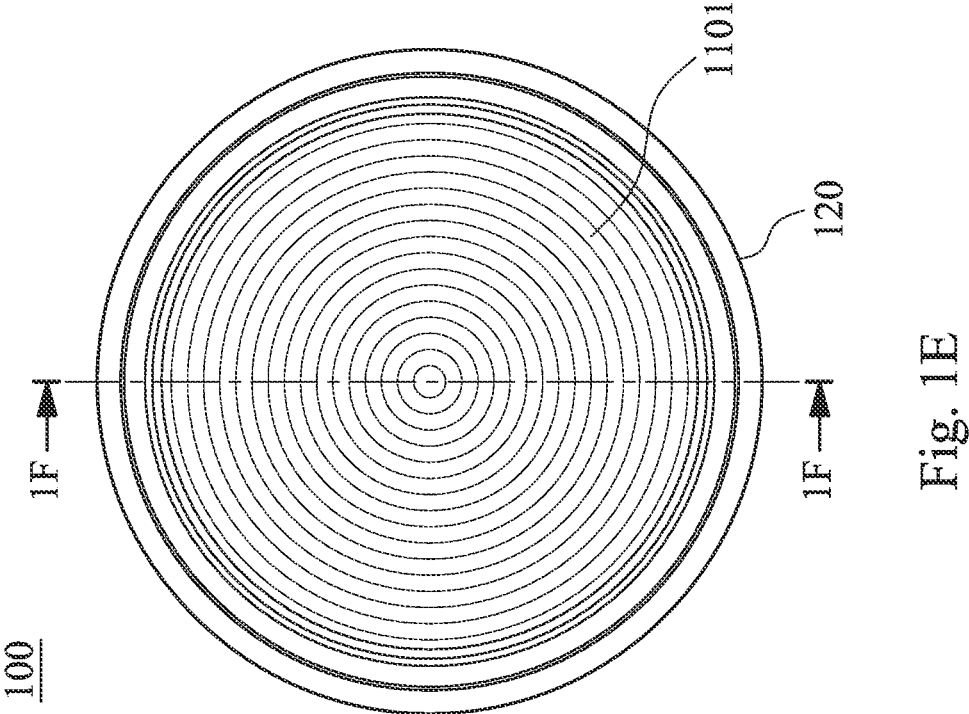
FIG. 1E is a schematic view of an image side of the imaging lens assembly in FIG. 1A.
Figure 1D:
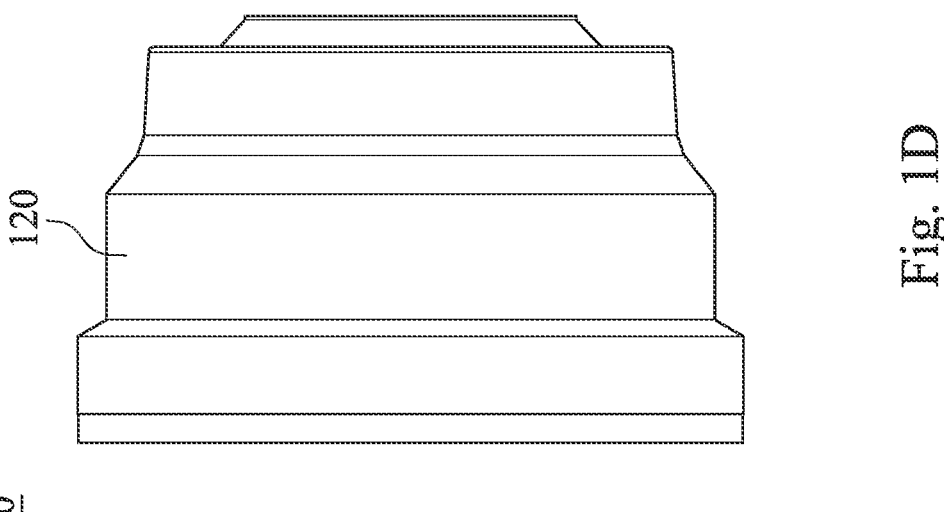
FIG. 1D is a lateral view of the imaging lens assembly in FIG. 1A.
Figures 1F, 1G:
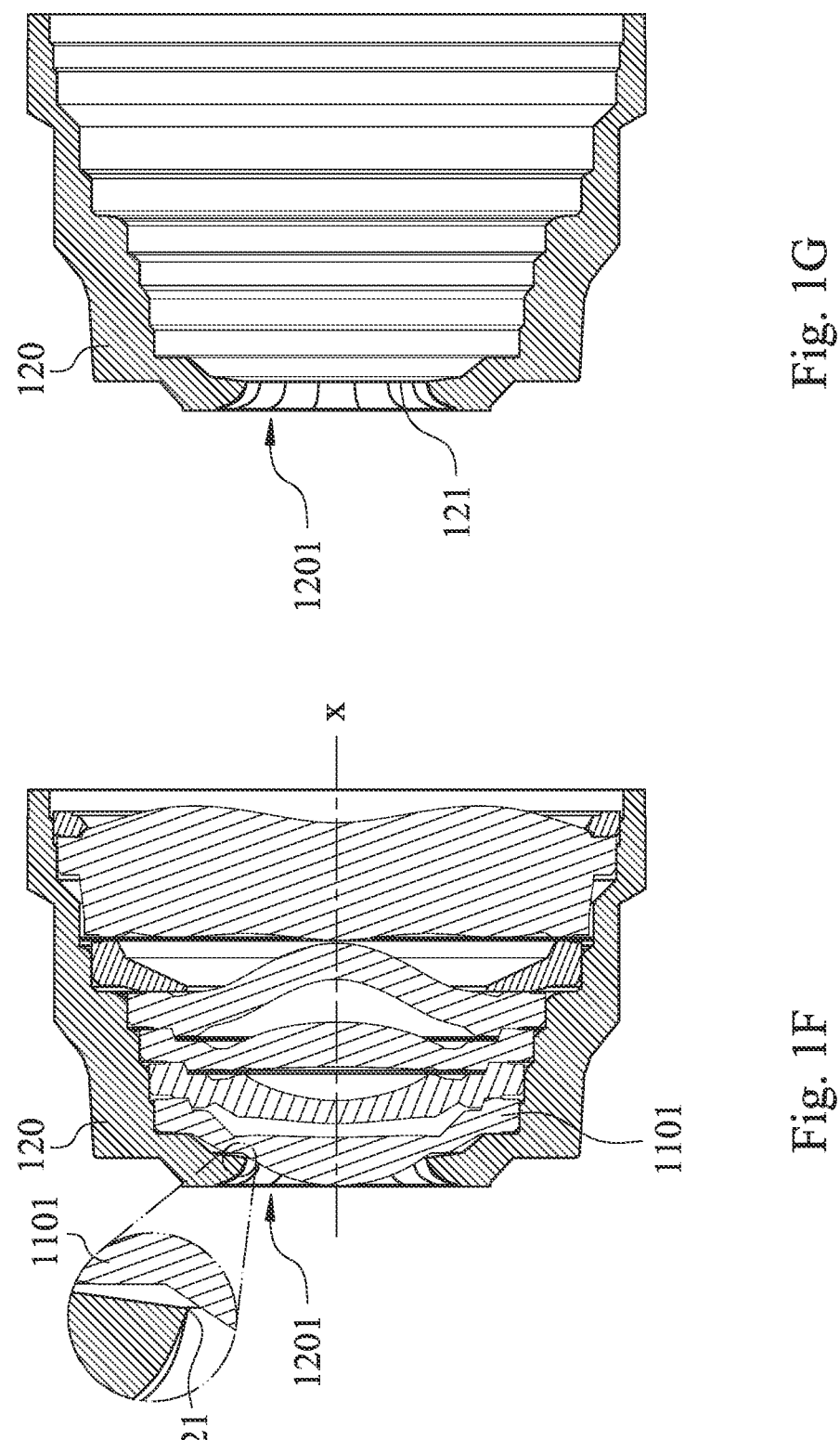
FIG. 1F is a sectional view of FIG. 1E taken along a line 1F-1F.
FIG. 1G is a sectional view of a lens holding member in FIG. 1E taken along the line 1F-1F.

Please refer to FIGS. 1A to 1F, wherein FIG. 1A is a three-dimensional view of an imaging lens assembly 100 of the 1st example according to the 1st embodiment of the present disclosure, FIG. 1B is an exploded view of the imaging lens assembly 100 in FIG. 1A, FIG. 1C is another exploded view of the imaging lens assembly 100 in FIG. 1A, FIG. 1D is a lateral view of the imaging lens assembly 100 in FIG. 1A, FIG. 1E is a schematic view of an image side of the imaging lens assembly 100 in FIG. 1A, and FIG. 1F is a sectional view of FIG. 1E taken along a line 1F-1F. In FIGS. 1A to 1F, the imaging lens assembly 100 has an optical axis X and includes an imaging lens set (its reference numeral is omitted) and a lens holding member 120. The optical axis X passes through the imaging lens set, and the lens holding member 120 accommodates the imaging lens set for aligning the imaging lens set with the optical axis X. In detail, in the 1st example of the 1st embodiment, the imaging lens set includes five optical lens elements 1101, and the optical lens elements 1101 are disposed in the lens holding member 120 along the optical axis X with other optical elements. Specifically, from an object side to an image side of the imaging lens assembly 100, the lens holding member 120 accommodates two optical lens elements 1101, a light-blocking sheet 1102, an optical lens element 1101, a light-blocking sheet 1102, an optical lens element 1101, a spacer 1103, a light-blocking sheet 1102, an optical lens element 1101, and a retainer 1104.

Figure 1H:
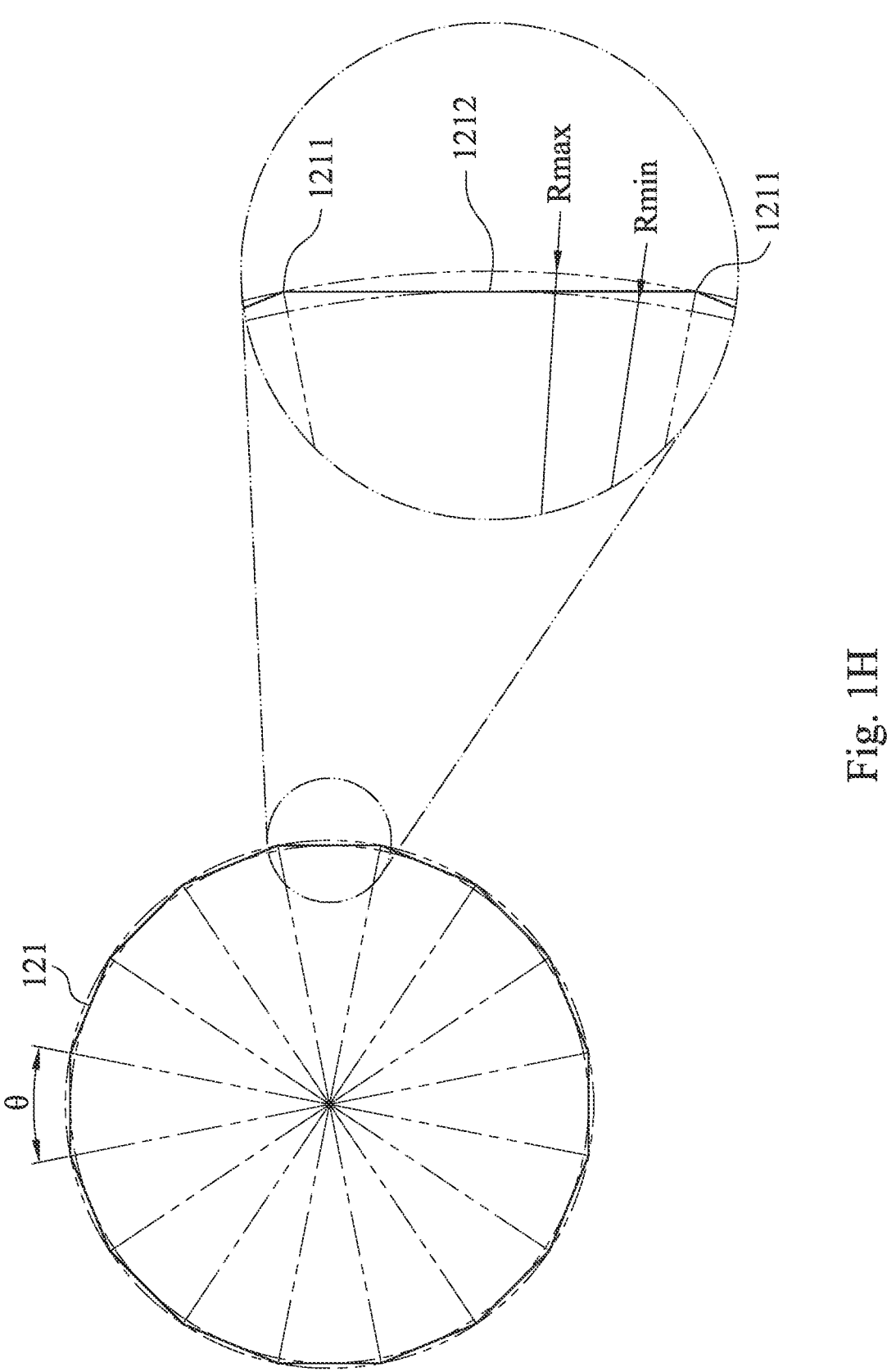
FIG. 1H is a schematic view of a plurality of light-blocking structures disposed on the lens holding member in FIG. 1B.
Figure 1T:
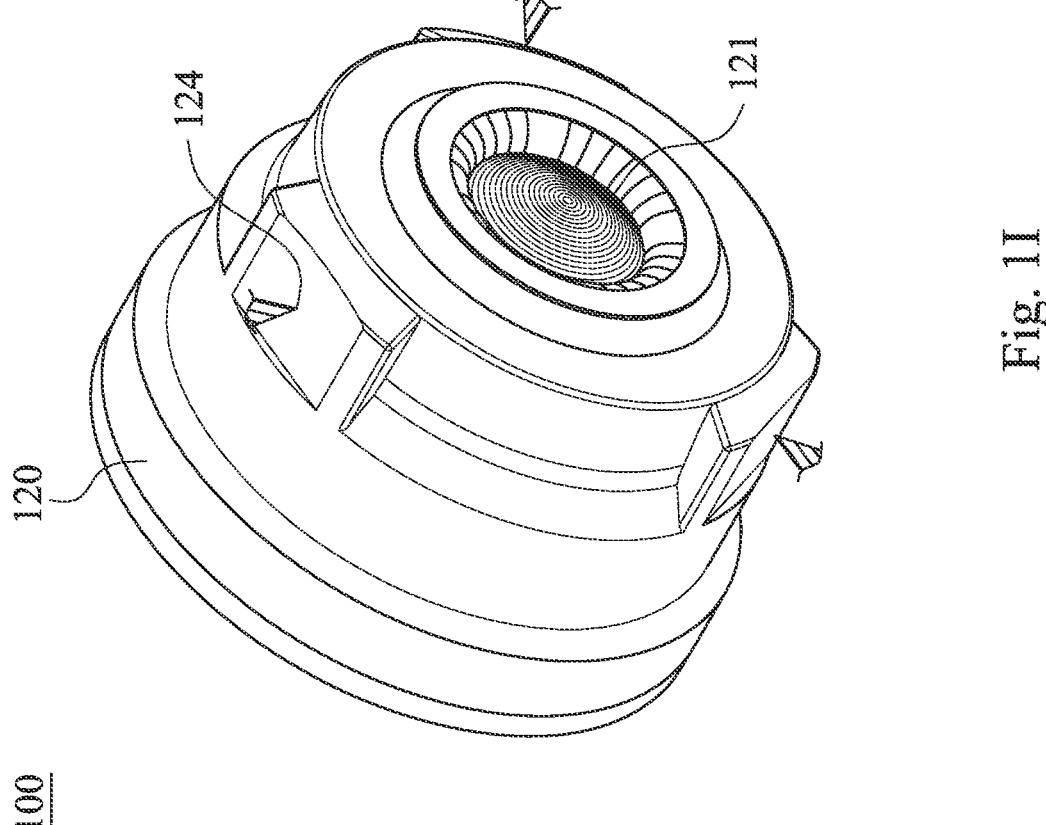
FIG. 1I is a three-dimensional view of an imaging lens assembly of the 2nd example according to the 1st embodiment of the present disclosure.
FIG. 1J is a lateral view of the imaging lens assembly in FIG. 1I.
FIG. 1K is a schematic view of an image side of the imaging lens assembly in FIG. 1I.
FIG. 1L is a sectional view of FIG. 1K taken along a line 1L-1L.
FIG. 1M is a sectional view of a lens holding member in FIG. 1K taken along the line 1L-1L.
FIG. 1N is a schematic view of a plurality of light-blocking structures disposed on the lens holding member in FIG. 1I.
FIG. 1O is a schematic view of a plurality of light-blocking structures disposed on a lens holding member of an imaging lens assembly of the 3rd example according to the 1st embodiment of the present disclosure.

Please refer to FIGS. 1G and 1H, wherein FIG. 1G is a sectional view of a lens holding member 120 in FIG. 1E taken along the line 1F-1F, and FIG. 1H is a schematic view of a plurality of light-blocking structures 121 disposed on the lens holding member 120 in FIG. 1B. In FIGS. 1B, 1C, and 1G, the lens holding member 120 includes the plurality of light-blocking structures 121, the light-blocking structures 121 are disposed on the object side of the imaging lens set and surround the optical axis X for forming a light passing hole 1201, and the lens holding member 120 and the light-blocking structures 121 are formed integrally. In the 1st example of the 1st embodiment, the light passing hole 1201 is an aperture of the imaging lens assembly 100 for controlling an amount of incident light of the imaging lens assembly 100. Each of the light-blocking structures 121 is formed by connecting and intersecting a first tapered surface 122 and a second tapered surface 123, wherein the first tapered surface 122 faces toward the object side of the imaging lens assembly 100 and tapers toward the image side of the imaging lens assembly 100, and the second tapered surface 123 faces toward the image side of the imaging lens assembly 100 and tapers toward the object side of the imaging lens assembly 100. That is, the first tapered surface 122 and the second tapered surface 123 taper toward the optical axis X from the object side to the image side of the imaging lens assembly 100 and from the image side to the object side of the imaging lens assembly 100, respectively, and form each of the light-blocking structures 121 with a taper shape.

In FIG. 1H, each of the light-blocking structures 121 is a straight-line shape and has two end points 1211 and one central point 1212, wherein the central point 1212 is closer to the optical axis X than each of the end points 1211 thereto. Specifically, two adjacent end points 1211 of any adjacent two light-blocking structures 121, respectively, are connected to each other, so that the light-blocking structures 121 surround the optical axis X and form the light passing hole 1201 shaped as a polygon. In the 1st example of the 1st embodiment, a total number of the light-blocking structures 121 is N and N is 16. That is, the light passing hole 1201 is a 16-sided polygon and is a regular polygon.

With reference to FIG. 1F, there is no contact between the light-blocking structures 121 and the optical lens element 1101 which is closest to the object side, that is, there is no contact between the light-blocking structures 121 and the imaging lens set. Furthermore, each of the light-blocking structures 121 overlaps with the imaging lens set along a direction parallel to the optical axis X.

With reference to FIG. 1H, a maximum radius of the light passing hole 1201 is defined as Rmax by a position near each of the two end points 1211 of each of the light-blocking structures 121, and a minimum radius of the light passing hole 1201 is defined as Rmin by a position near the central point 1212 of each of the light-blocking structures 121, which is closest to the optical axis X. There is an angle being θ between two connecting lines from the two end points 1211, respectively, of each of the light-blocking structures 121 to the optical axis X, and a focal length of the imaging lens assembly 100 is EFL. The light passing hole 1201 has a circularity tolerance value being t and a circularity coefficient being tc, wherein t=Rmax−Rmin, and tc=t/Rmax× 100%. The parameters mentioned above satisfy the values in Table 1A.

TABLE 1A

| the 1st example of the 1st embodiment | | | |
|---|---|---|---|
| θ (degrees) | 22.5 | tc (%) | 1.93 |
| Rmax (mm) | 0.935 | EFL (mm) | 4.16 |
| Rmin (mm) | 0.917 | EFL/(2 × Rmin) | 2.3 |
| t (mm) | 0.018 | | |

Figure 1K:
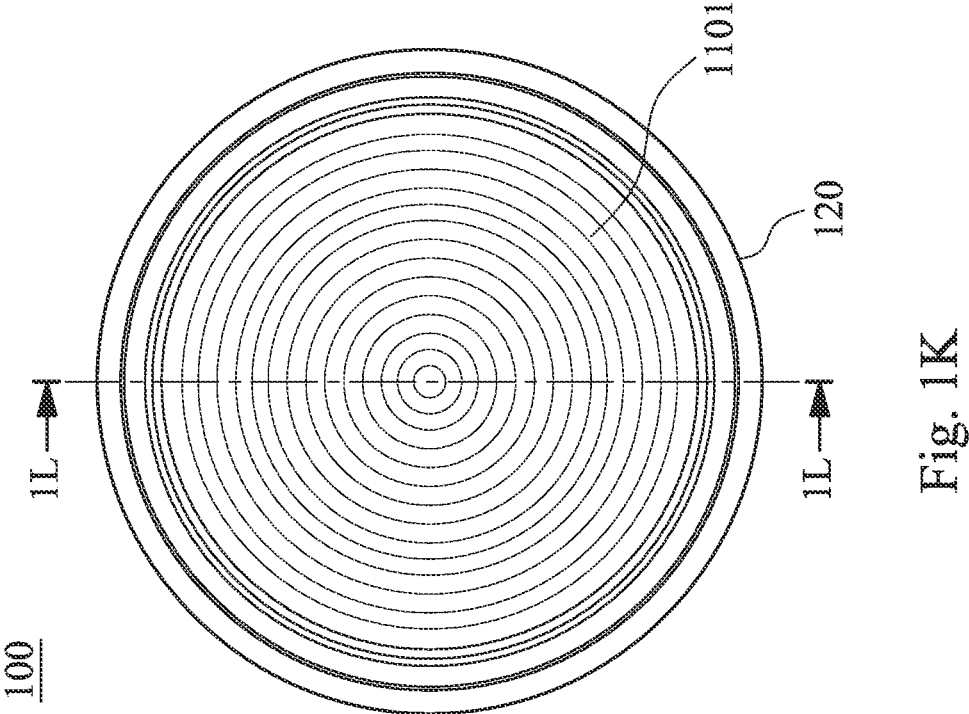
Figure 1J:
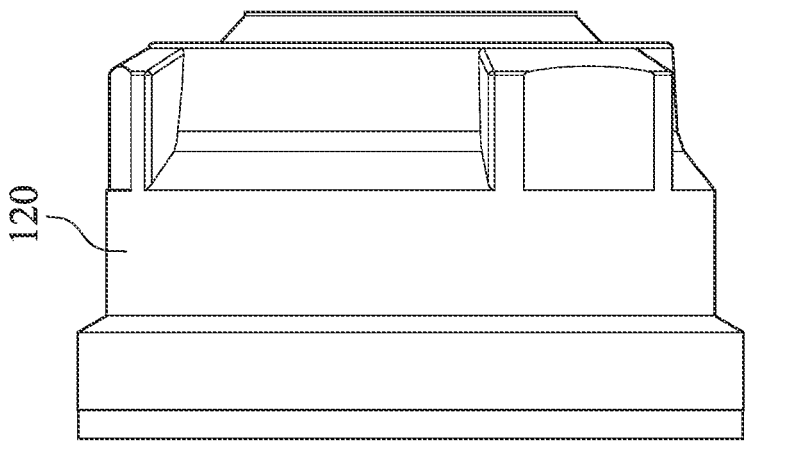
Figures 1L, 1M:
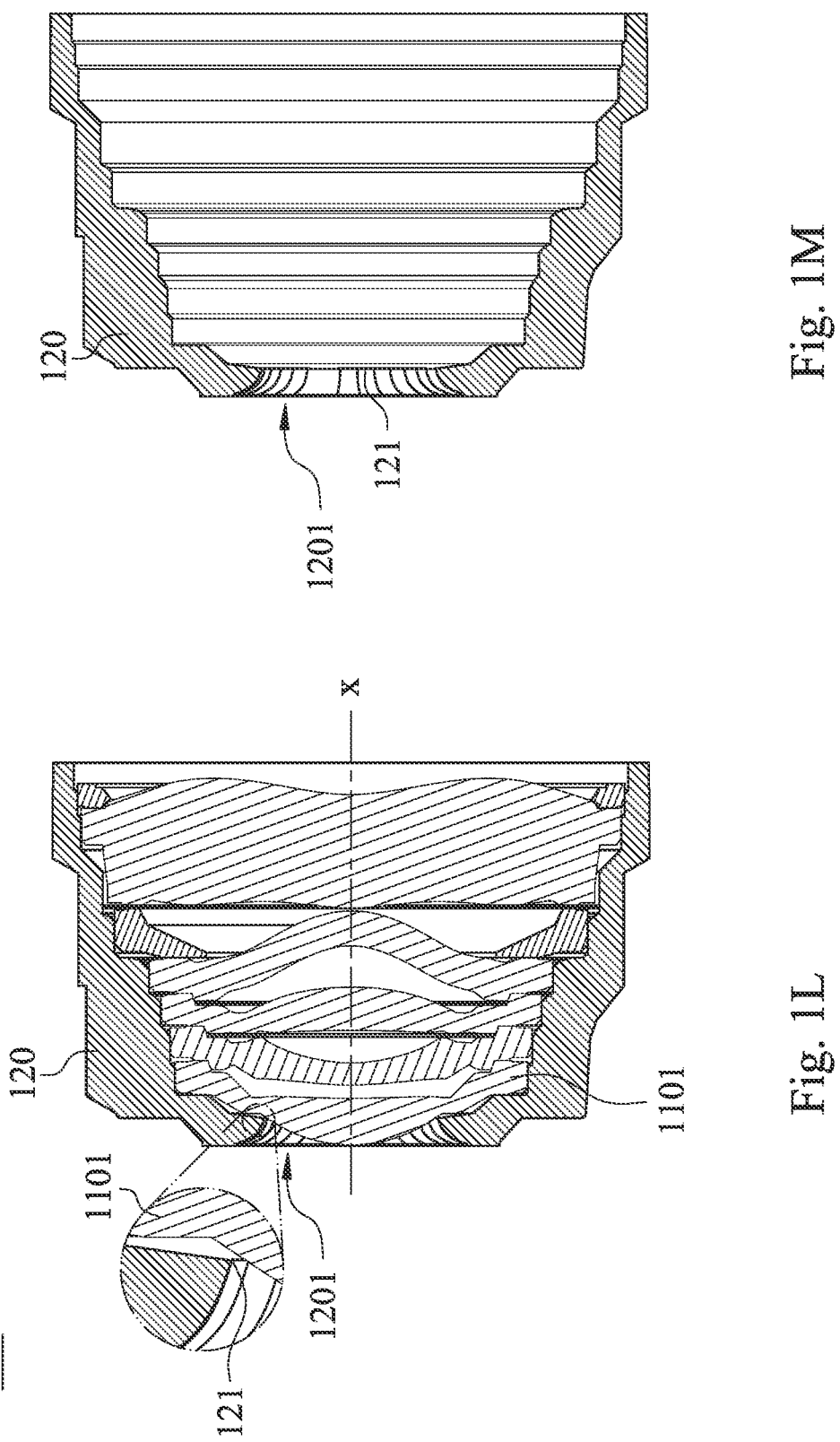

Please refer to FIGS. 1I to 1L, wherein FIG. 1I is a three-dimensional view of an imaging lens assembly 100 of the 2nd example according to the 1st embodiment of the present disclosure, FIG. 1J is a lateral view of the imaging lens assembly 100 in FIG. 1I, FIG. 1K is a schematic view of an image side of the imaging lens assembly 100 in FIG. 1I, and FIG. 1L is a sectional view of FIG. 1K taken along a line 1L-1L. In FIGS. 1I to 1L, the imaging lens assembly 100 of the 2nd example of the 1st embodiment has an optical axis X and includes an imaging lens set (its reference numeral is omitted) and a lens holding member 120. Only the differences between the imaging lens assembly 100 of the 2nd example of the 1st embodiment and the imaging lens assembly 100 of the 1st example of the 1st embodiment will be described below, and the others of the same element structures and the technical features thereof will not be repeated herein.

In FIG. 1I, the lens holding member 120 has at least two gate marks 124. Specifically, in the imaging lens assembly 100 of the 2nd example of the 1st embodiment, a number of the gate marks 124 is three, and the gate marks 124 is located on an outer side of the lens holding member 120.

Figure 1N:
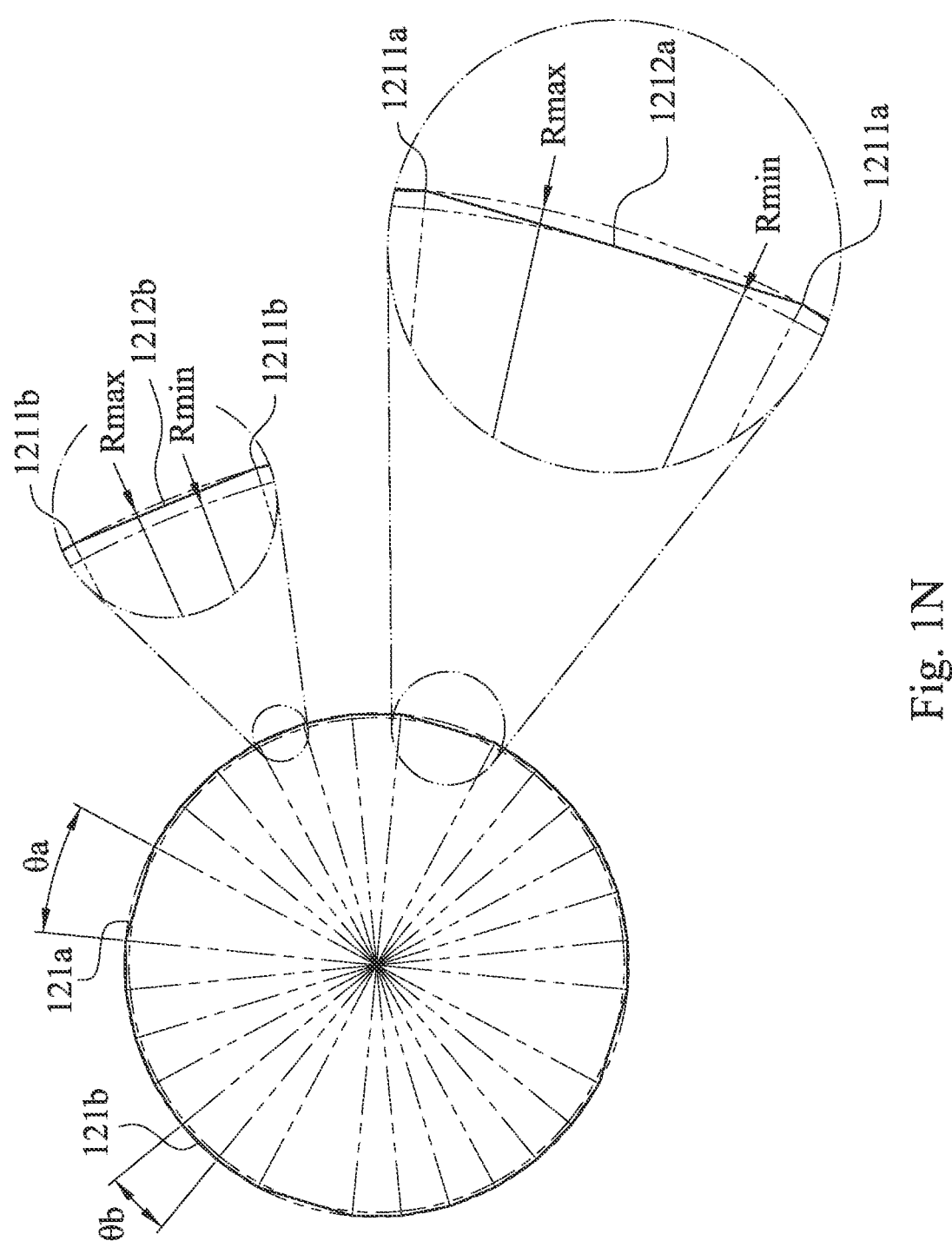
Figure 10:
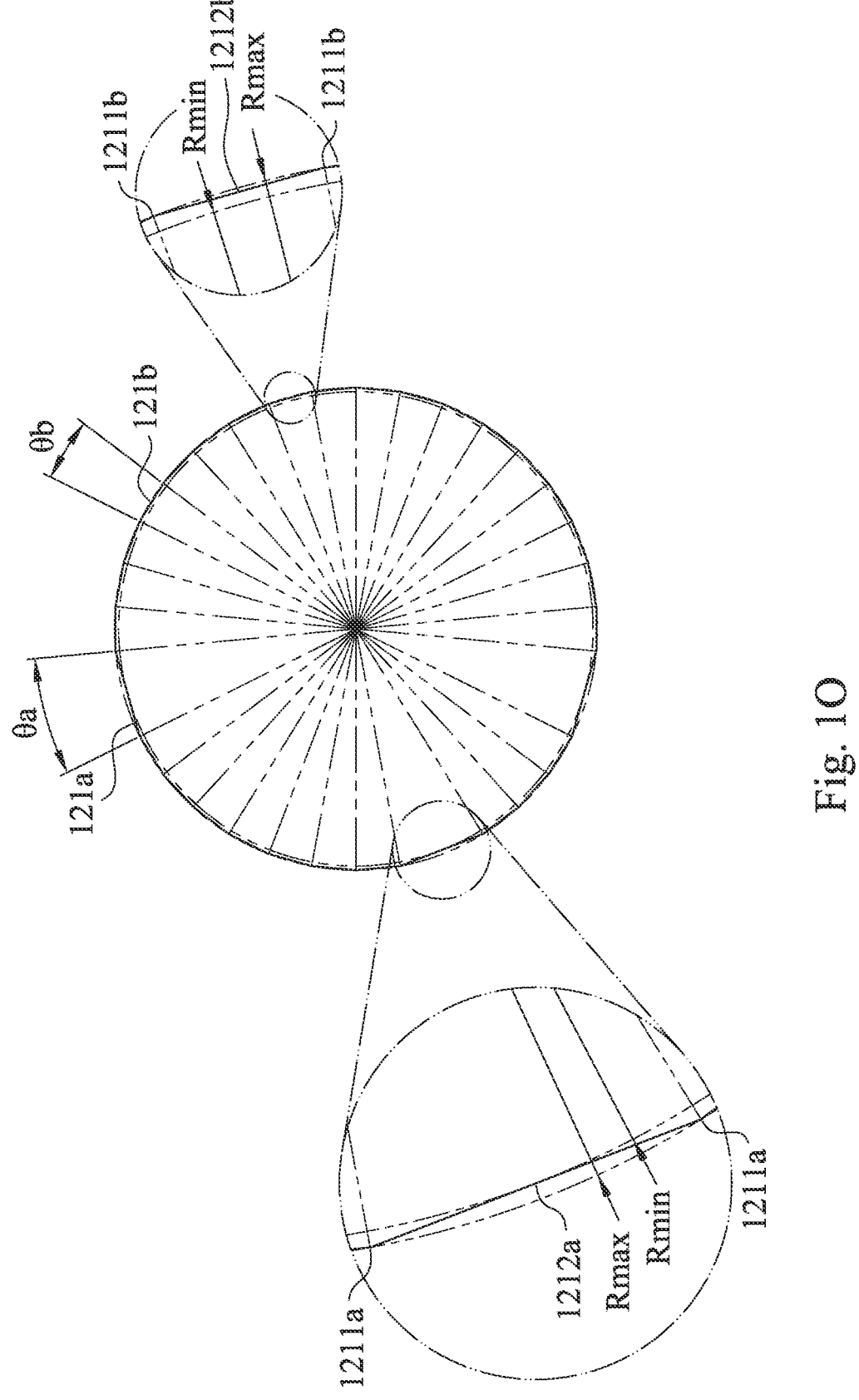

Please refer to FIGS. 1M and 1N, wherein FIG. 1M is a sectional view of a lens holding member 120 in FIG. 1K taken along the line 1L-1L, and FIG. 1N is a schematic view of a plurality of light-blocking structures 121a, 121b disposed on the lens holding member 120 in FIG. 1I. In FIGS. 1I, 1M, and 1N, the lens holding member 120 includes a plurality of light-blocking structures 121a, 121b, the light-blocking structures 121a, 121b are disposed on an object side of the imaging lens set and surround the optical axis X for forming a light passing hole 1201, and the lens holding member 120 and the light-blocking structures 121a, 121b are formed integrally. In the 2nd example of the 1st embodiment, the light passing hole 1201 is an aperture of the imaging lens assembly 100 for controlling an amount of incident light of the imaging lens assembly 100. In FIG. 1L, there is no contact between the light-blocking structures 121a, 121b and the optical lens elements 1101 which is closest to the object side, that is, there is no contact between the light-blocking structures 121a, 121b and the imaging lens set. Furthermore, the light-blocking structures 121a, 121b overlap with the imaging lens set along a direction parallel to the optical axis X.

In FIG. 1N, there are two types of the light-blocking structures 121a, 121b in the 2nd example of the 1st embodiment, each of the light-blocking structures 121a, 121b is a straight-line shape, and the light-blocking structures 121a, 121b have two end points 1211a, 1211b, respectively, and one central point 1212a, 1212b, respectively. Each of the central points 1212a, 1212b is closer to the optical axis X than each of the two end points 1211a, 1211b to the optical axis X. Specifically, two adjacent end points 1211a, 1211b of any adjacent two light-blocking structures 121a, 121b, respectively, are connected to each other, so that the light-blocking structures 121a, 121b surround the optical axis X and form the light passing hole 1201 shaped as a polygon. A number of the light-blocking structures 121a is 5, and a number of the light-blocking structures 121b is 24. That is, a total number of the light-blocking structures 121a, 121b is N and N is 29.

In the 2nd example of the 1st embodiment, a maximum radius of the light passing hole 1201 is defined as Rmax, and a minimum radius of the light passing hole 1201 is defined as Rmin. There is an angle being θa between two connecting lines from the two end points 1211a, respectively, of each of the light-blocking structures 121a to the optical axis X, there is an angle being θb between two connecting lines from the two end points 1211b, respectively, of each of the light-blocking structures 121b to the optical axis X, and a focal length of the imaging lens assembly 100 is EFL. The light passing hole 1201 has a circularity tolerance value being t and a circularity coefficient being tc, wherein t=Rmax− Rmin, and tc=t/Rmax×100%. The parameters mentioned above satisfy the values in Table 1B.

TABLE 1B

| the 2nd example of the 1st embodiment | | | |
|---|---|---|---|
| θa (degrees) | 22.5 | θb (degrees) | 11.25 |
| Rmax (mm) | 0.935 | tc (%) | 1.82 |
| Rmin (mm) | 0.918 | EFL (mm) | 4.16 |
| t (mm) | 0.017 | EFL/(2 × Rmin) | 2.3 |

9

10

Please refer to FIG. 1O, FIG. 1O is a schematic view of the light-blocking structures 121a, 121b disposed on a lens holding member of an imaging lens assembly of the 3rd example according to the 1st embodiment of the present disclosure. Only the differences between the imaging lens assembly of the 3rd example of the 1st embodiment and the imaging lens assembly 100 of the 1st example of the 1st embodiment will be described below, and the others of the same element structures and the technical features thereof will not be repeated herein. In FIG. 1O, the lens holding member includes a plurality of light-blocking structures 121a, 121b, the light-blocking structures 121a, 121b surround the optical axis for forming a light passing hole 1201. There are two types of the light-blocking structures 121a, 121b in the 3rd example of the 1st embodiment, each of the light-blocking structures 121a, 121b is a straight-line shape, and the light-blocking structures 121a, 121b have two end points 1211a, 1211b, respectively, and one central point 1212a, 1212b, respectively. Each of the central points 1212a, 1212b is closer to the optical axis than each of the two end points 1211a, 1211b to the optical axis. Specifically, two adjacent end points 1211a, 1211b of any adjacent two light-blocking structures 121a, 121b, respectively, are connected to each other, so that the light-blocking structures 121a, 121b surround the optical axis and form the light passing hole 1201 shaped as a polygon. A number of the light-blocking structures 121a is 3, and number of the light-blocking structures 121b is 28. That is, a total number of the light-blocking structures 121a, 121b is N and N is 31.

In the 3rd example of the 1st embodiment, a maximum radius of the light passing hole 1201 is defined as Rmax, and a minimum radius of the light passing hole 1201 is defined as Rmin. There is an angle being ea between two connecting lines from the two end points 1211a, respectively, of each of the light-blocking structures 121a to the optical axis, there is an angle being θb between two connecting lines from the two end points 1211b, respectively, of each of the light-blocking structures 121b to the optical axis, and a focal length of the imaging lens assembly 100 is EFL. The light passing hole 1201 has a circularity tolerance value being t and a circularity coefficient being tc, wherein t=Rmax−Rmin, and tc=t/Rmax×100%. The parameters mentioned above satisfy the values in Table 1C.

TABLE 1C

| the 3rd example of the 1st embodiment | | | |
|---|---|---|---|
| θa (degrees) | 21.18 | θb (degrees) | 10.59 |
| Rmax (mm) | 0.935 | tc (%) | 1.71 |
| Rmin (mm) | 0.919 | EFL (mm) | 4.16 |
| t (mm) | 0.016 | EFL/(2 × Rmin) | 2.3 |

2nd Embodiment

Figure 2A:
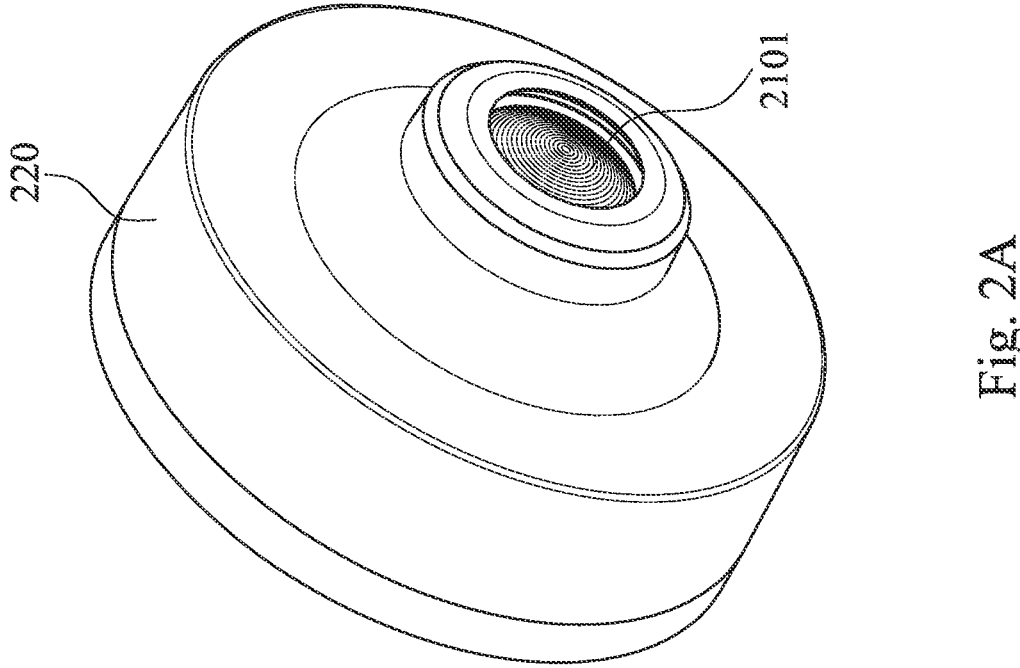
FIG. 2A is a three-dimensional view of an imaging lens assembly of the 1st example according to the 2nd embodiment of the present disclosure.
Figure 2B:
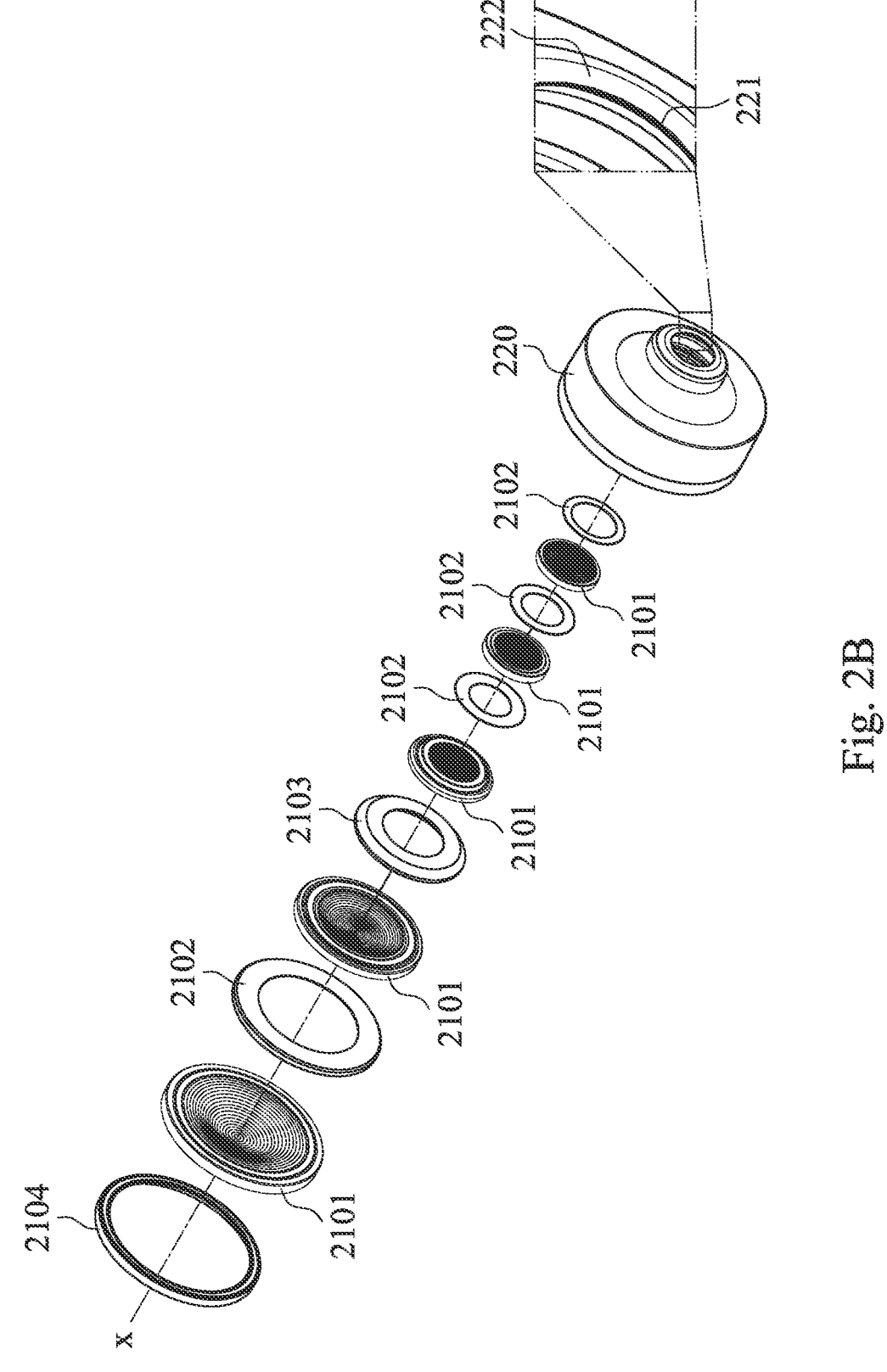
FIG. 2B is an exploded view of the imaging lens assembly in FIG. 2A.
Figure 2C:
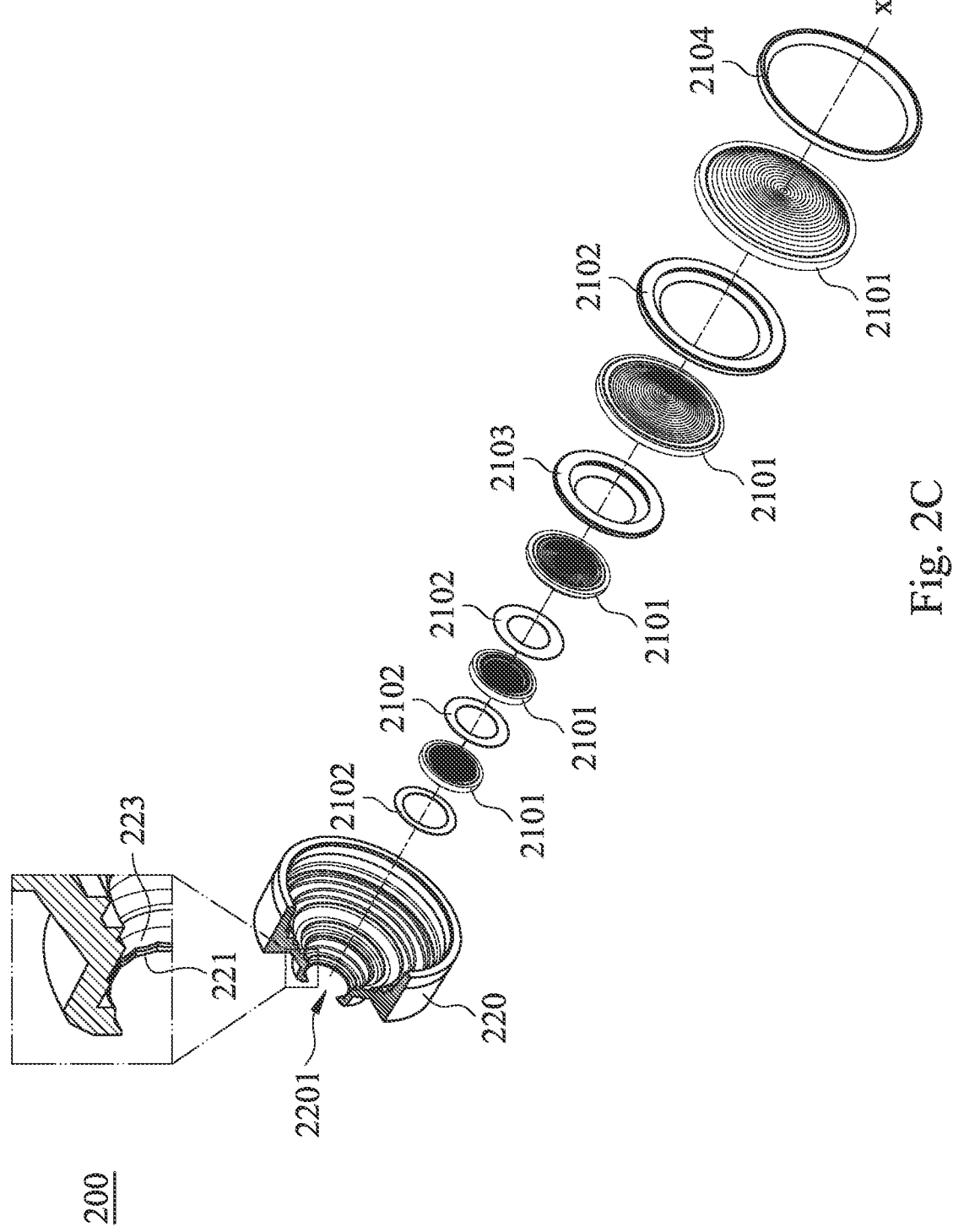
FIG. 2C is another exploded view of the imaging lens assembly in FIG. 2A.
Figure 2E:
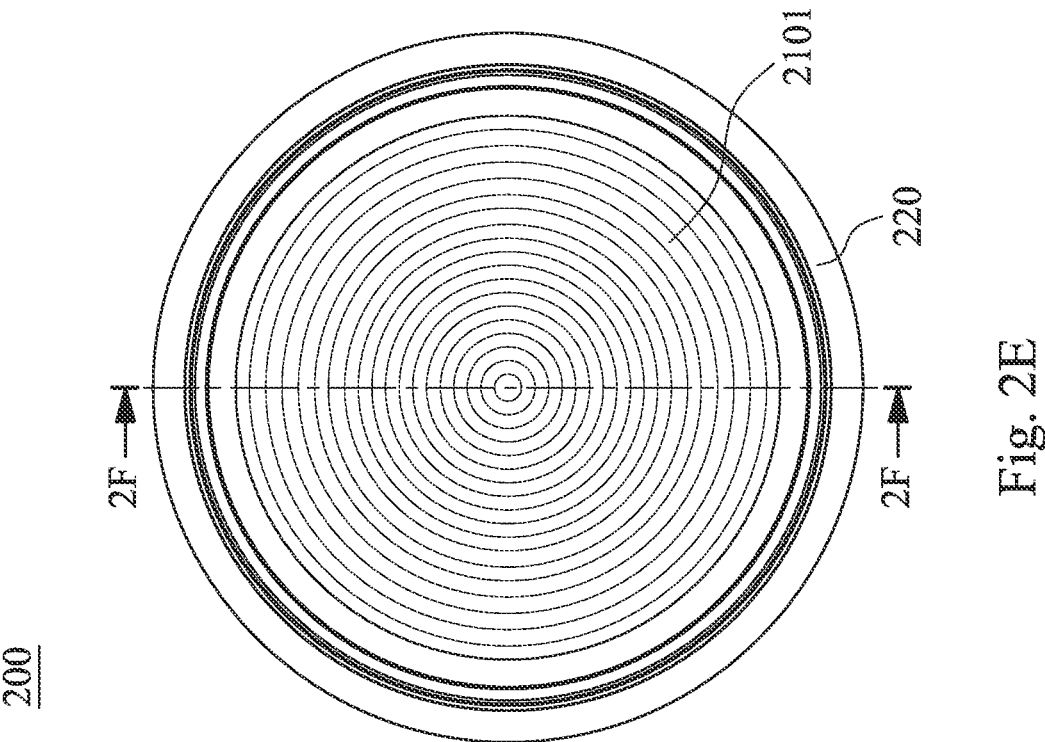
FIG. 2E is a schematic view of an image side of the imaging lens assembly in FIG. 2A.
Figure 2D:
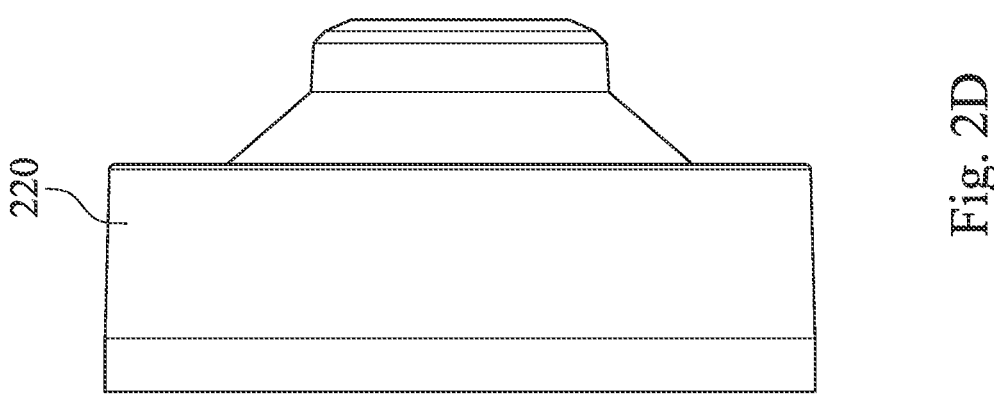
FIG. 2D is a lateral view of the imaging lens assembly in FIG. 2A.
Figures 2F, 2G:
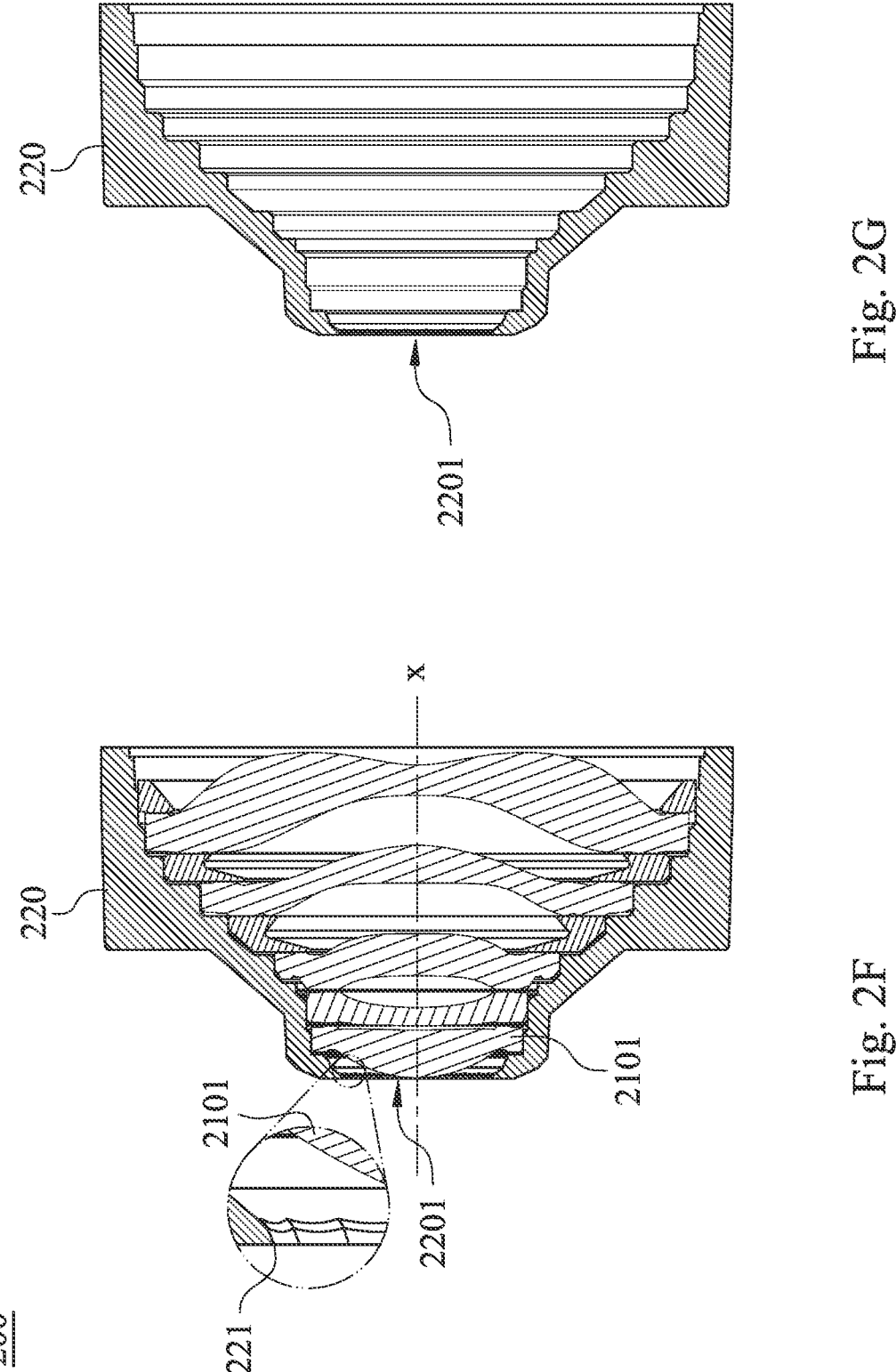
FIG. 2F is a sectional view of FIG. 2E taken along a line 2F-2F.
FIG. 2G is a sectional view of a lens holding member in FIG. 2E taken along the line 2F-2F.

Please refer to FIGS. 2A to 2F, wherein FIG. 2A is a three-dimensional view of an imaging lens assembly 200 of the 1st example according to the 2nd embodiment of the present disclosure, FIG. 2B is an exploded view of the imaging lens assembly 200 in FIG. 2A, FIG. 2C is another exploded view of the imaging lens assembly 200 in FIG. 2A, FIG. 2D is a lateral view of the imaging lens assembly 200 in FIG. 2A, FIG. 2E is a schematic view of an image side of the imaging lens assembly 200 in FIG. 2A, and FIG. 2F is a sectional view of FIG. 2E taken along a line 2F-2F. In FIGS. 2A to 2F, the imaging lens assembly 200 has an optical axis X and includes an imaging lens set (its reference numeral is omitted) and a lens holding member 220. The optical axis X passes through the imaging lens set, and the lens holding member 220 accommodates the imaging lens set for aligning the imaging lens set with the optical axis X. In detail, in the 1st example of the 2nd embodiment, the imaging lens set includes five optical lens elements 2101, and the optical lens elements 2101 are disposed in the lens holding member 220 along the optical axis X with other optical elements. Specifically, from an object side to an image side of the imaging lens assembly 200, the lens holding member 220 accommodates a light-blocking sheet 2102, an optical lens element 2101, a light-blocking sheet 2102, an optical lens element 2101, a light-blocking sheet 2102, an optical lens element 2101, a spacer 2103, an optical lens element 2101, a light-blocking sheet 2102, an optical lens element 2101, and a retainer 2104.

Figure 2H:
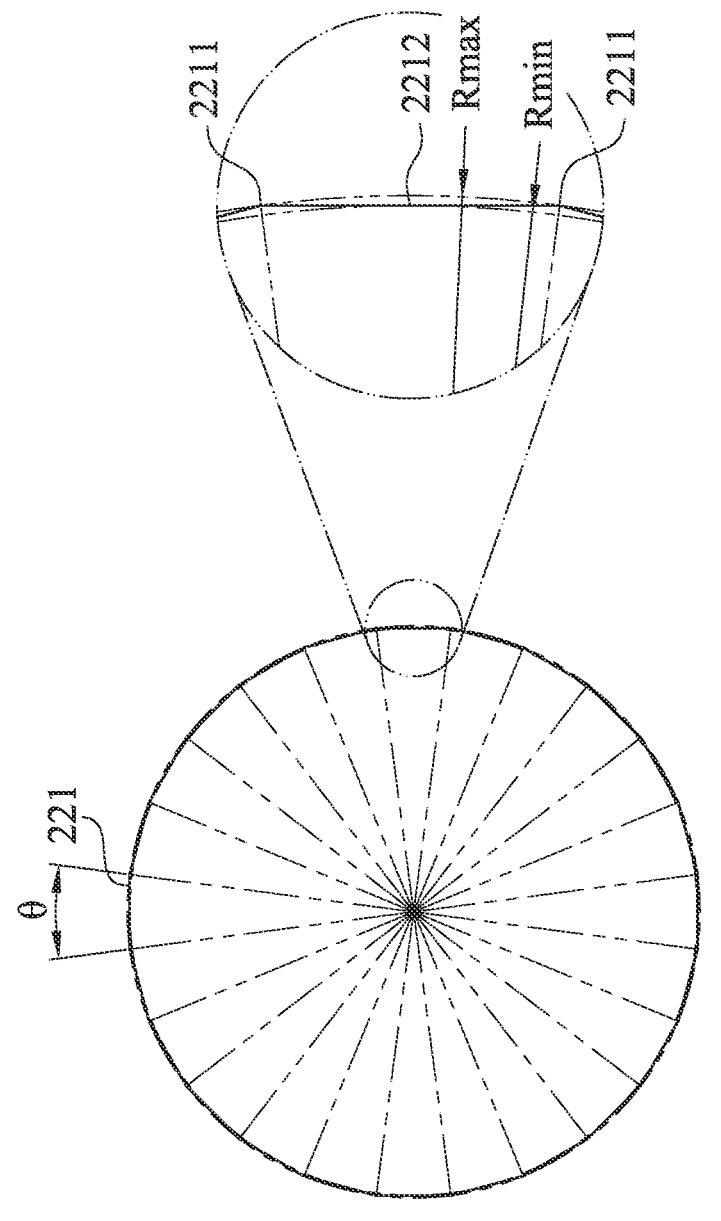
FIG. 2H is a schematic view of a plurality of light-blocking structures disposed on the lens holding member in FIG. 2B.

Please refer to FIGS. 2G and 2H, wherein FIG. 2G is a sectional view of a lens holding member 220 in FIG. 2E taken along the line 2F-2F, and FIG. 2H is a schematic view of the light-blocking structures 221 disposed on the lens holding member 220 in FIG. 2B. In FIGS. 2B, 2C, and 2G, the lens holding member 220 includes a plurality of light-blocking structures 221, the light-blocking structures 221 are disposed on an object side of the imaging lens set and surround the optical axis X for forming a light passing hole 2201, and the lens holding member 220 and the light-blocking structures 221 are formed integrally. In the 1st example of the 2nd embodiment, the light passing hole 2201 is an aperture of the imaging lens assembly 200 for controlling an amount of incident light of the imaging lens assembly 200. Each of the light-blocking structures 221 is formed by connecting and intersecting a first tapered surface 222 and a second tapered surface 223, wherein the first tapered surface 222 faces toward the object side of the imaging lens assembly 200 and tapers toward the image side of the imaging lens assembly 200, and the second tapered surface 223 faces toward the image side of the imaging lens assembly 200 and tapers toward the object side of the imaging lens assembly 200. That is, the first tapered surface 222 and the second tapered surface 223 taper toward the optical axis X from the object side to the image side of the imaging lens assembly 200 and from the image side to the object side of the imaging lens assembly 200, respectively, and form each of the light-blocking structures 221 with a taper shape.

In FIG. 2H, each of the light-blocking structures 221 is a straight-line shape and has two end points 2211 and one central point 2212, wherein the central point 2212 is closer to the optical axis X than each of the end points 2211 thereto. Specifically, two adjacent end points 2211 of any adjacent two light-blocking structures 221, respectively, are connected to each other, so that the light-blocking structures 221 surround the optical axis X and form the light passing hole 2201 shaped as a polygon. In the 1st example of the 2nd embodiment, a total number of the light-blocking structures 221 is N and N is 24. That is, the light passing hole 2201 is a 24-sided polygon and also a regular polygon.

With reference to FIG. 2F, there is no contact between the light-blocking structures 221 and the optical lens element 2101 which is closest to the object side, that is, there is no contact between the light-blocking structures 221 and the imaging lens set. Furthermore, each of the light-blocking structures 221 overlaps with the imaging lens set along a direction parallel to the optical axis X.

With reference to FIG. 2H, a maximum radius of the light passing hole 2201 is defined as Rmax by a position near each of the two end points 2211 of each of the light-blocking structures 221, and a minimum radius of the light passing hole 2201 is defined as Rmin by a position near the central point 2212 of each of the light-blocking structures 221, which is closest to the optical axis X. There is an angle being θ between two connecting lines from the two end points 2211, respectively, of each of the light-blocking structures 221 to the optical axis X, and a focal length of the imaging lens assembly 200 is EFL. The light passing hole 2201 has a circularity tolerance value being t and a circularity coefficient being tc, wherein t=Rmax−Rmin, and tc=t/Rmax× 100%. The parameters mentioned above satisfy the values in Table 2A.

TABLE 2A

| the 1st example of the 2nd embodiment | | | |
|---|---|---|---|
| θ (degrees) | 15 | tc (%) | 0.84 |
| Rmax (mm) | 0.830 | EFL (mm) | 3.74 |
| Rmin (mm) | 0.823 | EFL/(2 × Rmin) | 2.3 |
| t (mm) | 0.007 | | |

Figure 2I:
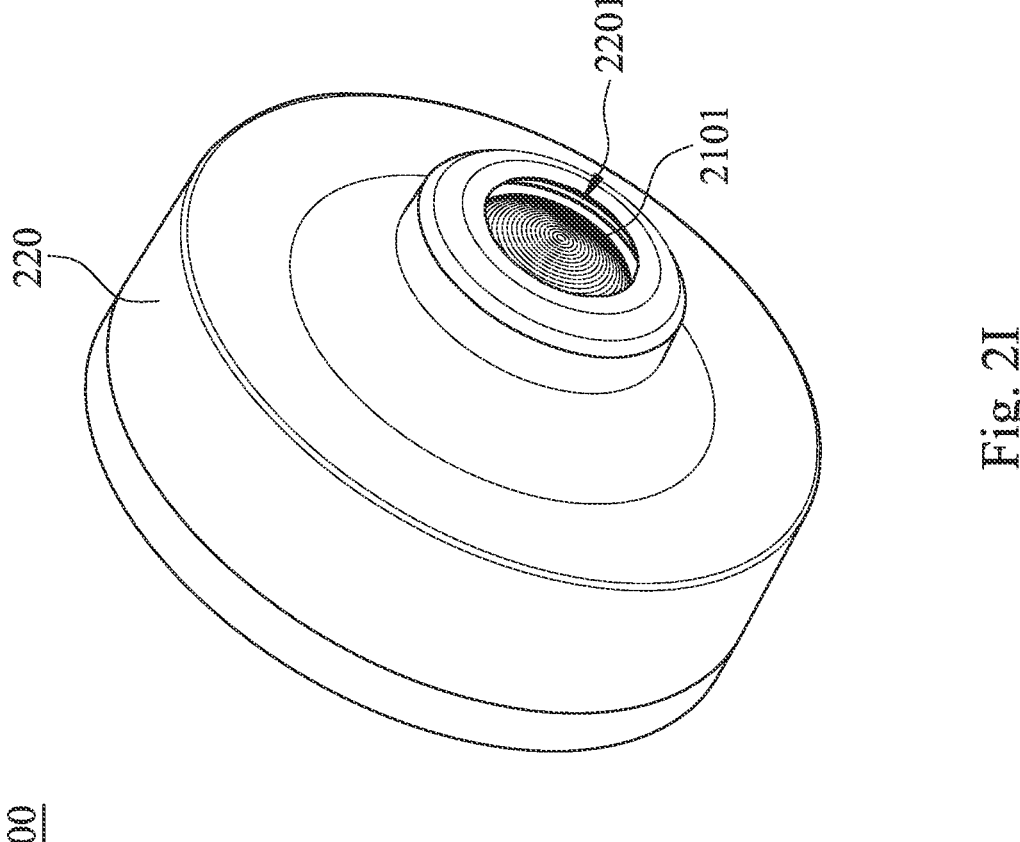
FIG. 2I is a three-dimensional view of an imaging lens assembly of the 2nd example according to the 2nd embodiment of the present disclosure.
Figure 2K:
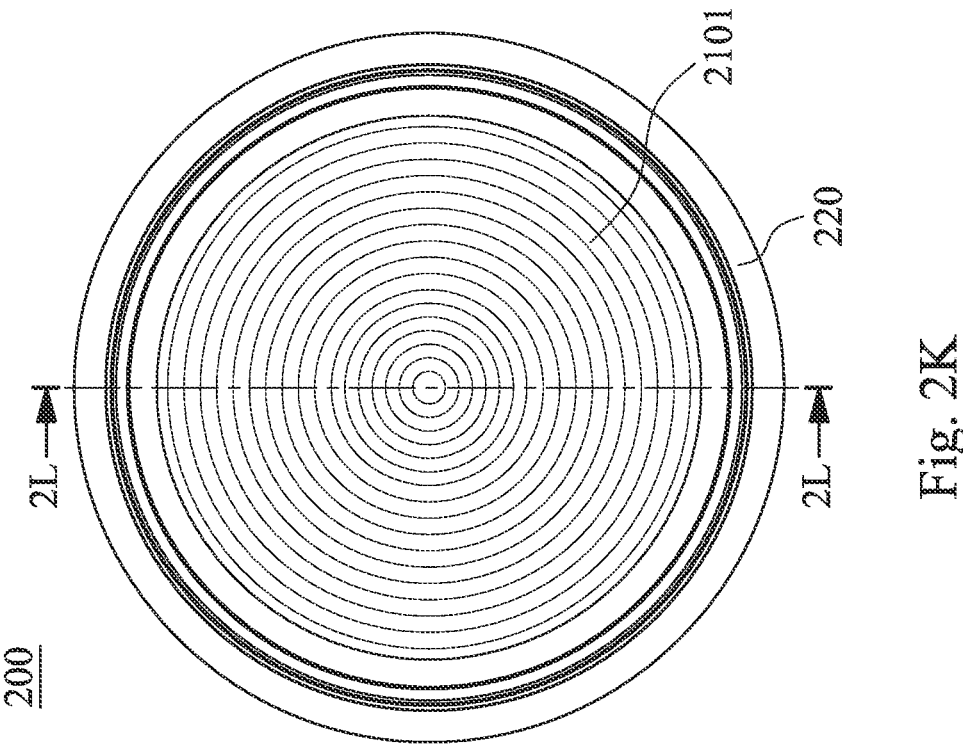
FIG. 2K is a schematic view of an image side of the imaging lens assembly in FIG. 2I.
Figure 2J:
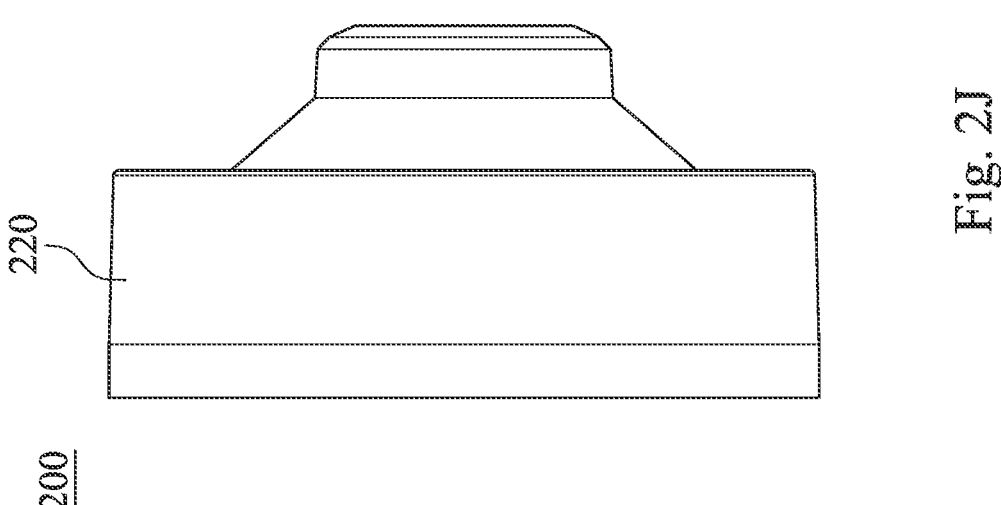
FIG. 2J is a lateral view of the imaging lens assembly in FIG. 2I.
Figures 2L, 2M:
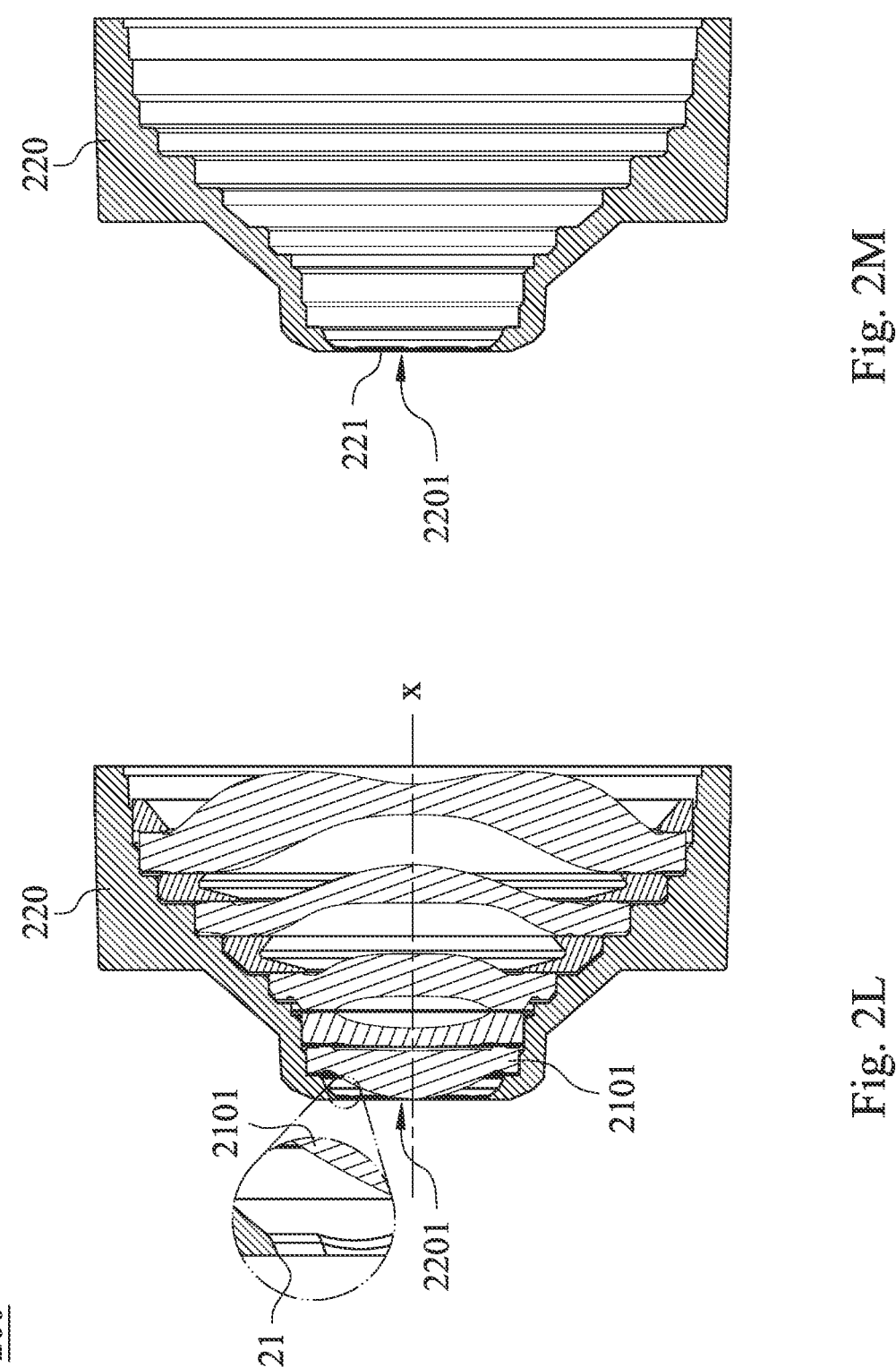
FIG. 2L is a sectional view of FIG. 2K taken along a line 2L-2L.
FIG. 2M is a sectional view of a lens holding member in FIG. 2K taken along the line 2L-2L.

Please refer to FIGS. 2I to 2L, wherein FIG. 2I is a three-dimensional view of an imaging lens assembly 200 of the 2nd example according to the 2nd embodiment of the present disclosure, FIG. 2J is a lateral view of the imaging lens assembly 200 in FIG. 2I, FIG. 2K is a schematic view of an image side of the imaging lens assembly 200 in FIG. 2I, and FIG. 2L is a sectional view of FIG. 2K taken along a line 2L-2L. In FIGS. 2I to 2L, the imaging lens assembly 200 of the 2nd example of the 2nd embodiment has an optical axis X and includes an imaging lens set (its reference numeral is omitted) and a lens holding member 220. Only the differences between the imaging lens assembly 200 of the 2nd example of the 2nd embodiment and the imaging lens assembly 200 of the 1st example of the 2nd embodiment will be described below, and the others of the same element structures and the technical features thereof will not be repeated herein.

Figure 2N:
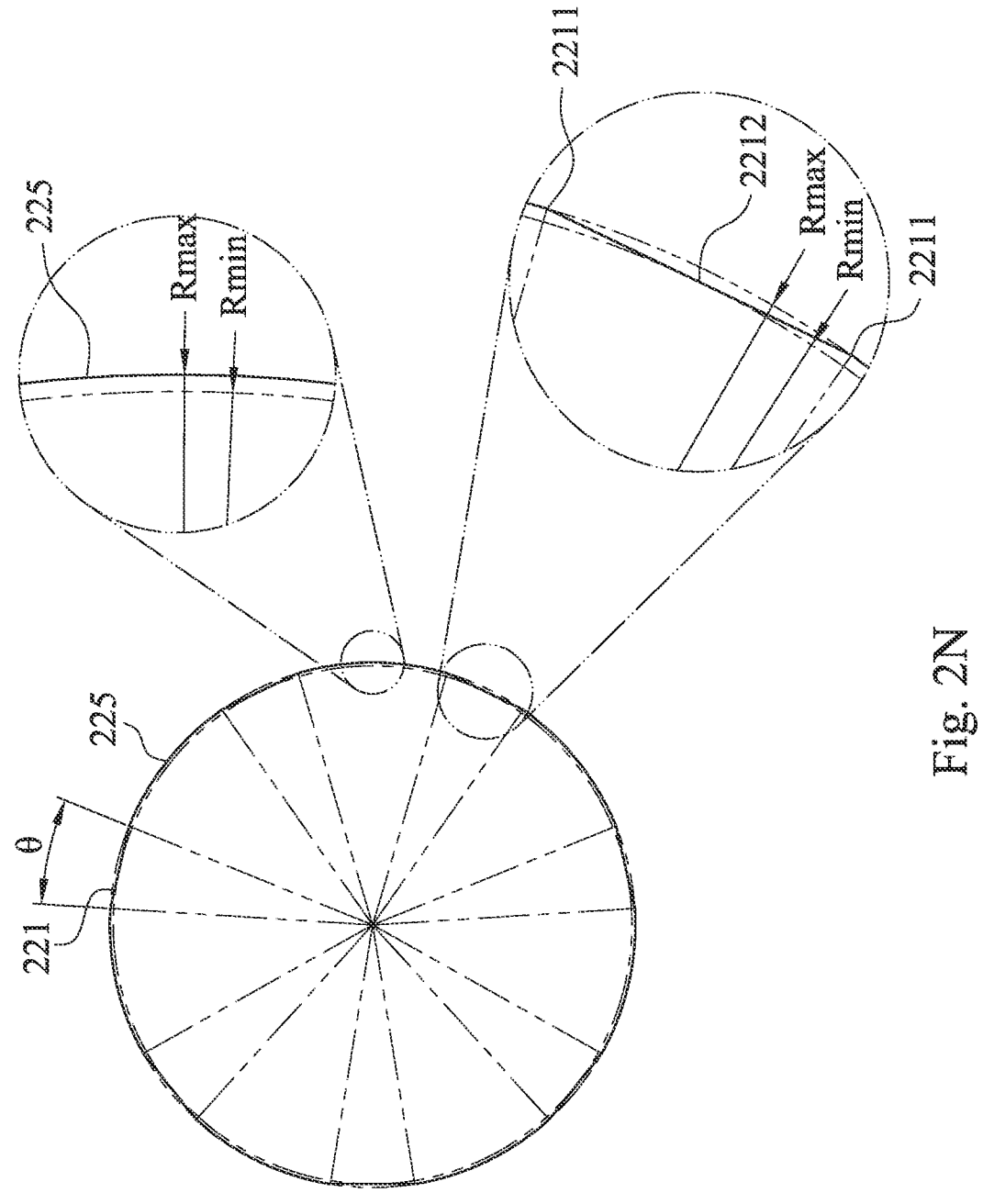
FIG. 2N is a schematic view of a plurality of light-blocking structures and a plurality of radius structures disposed on the lens holding member in FIG. 2I.
Figure 20:
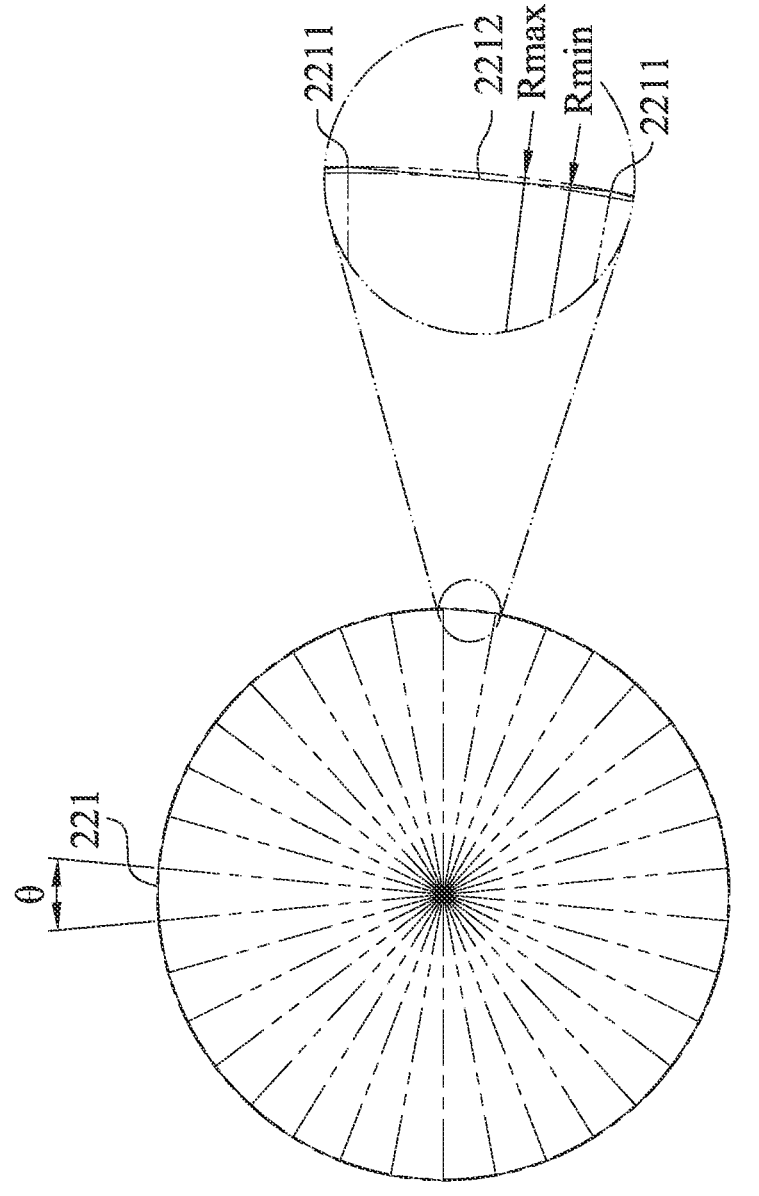

Please refer to FIGS. 2M and 2N, wherein FIG. 2M is a sectional view of a lens holding member 220 in FIG. 2K taken along the line 2L-2L, and FIG. 2N is a schematic view of a plurality of light-blocking structures 221 and a plurality of radius structures 225 disposed on the lens holding member 220 in FIG. 2I. In FIGS. 2I, 2M, and 2N, the lens holding member 220 includes the plurality of light-blocking structures 221, the light-blocking structures 221 and the radius structures 225 are disposed on an object side of the imaging lens set and alternatively connect to each other, and surround the optical axis X for forming a light passing hole 2201. The lens holding member 220, the light-blocking structures 221, and the radius structures 225 are formed integrally. In the 2nd example of the 2nd embodiment, the light passing hole 2201 is an aperture of the imaging lens assembly 200 for controlling an amount of incident light of the imaging lens assembly 200. A total number of the light-blocking structures 221 is N and N is 7, and a number of the radius structures 225 is 7.

In detail, each of the light-blocking structures 221 is a straight-line shape and has two end points 2211 and one central point 2212, and the central point 2212 is closer to the optical axis X than each of the two end points 2211 to the optical axis X. Each of the radius structures 225 is connected to two end points 2211 of adjacent two of the light-blocking structures 221, respectively. It should be noted that, each of the radius structures 225 is arc-shaped, a maximum radius of the light passing hole 2201 is defined as Rmax by a position near each of the two end points 2211 of each of the light-blocking structures 221, and a radius of the radius structures 225 is the maximum radius Rmax of the light passing hole 2201.

In FIG. 2N, the maximum radius of the light passing hole 2201 is Rmax, a minimum radius of the light passing hole 2201 is Rmin, there is an angle being θ between two connecting lines from the two end points 2211, respectively, of each of the light-blocking structures 221 to the optical axis X, and a focal length of the imaging lens assembly 200 is EFL. The light passing hole 2201 has a circularity tolerance value being t and a circularity coefficient being tc, wherein t=Rmax−Rmin, and tc=t/Rmax×100%. The parameters mentioned above satisfy the values in Table 2B.

TABLE 2B

| the 2nd example of the 2nd embodiment | | | |
|---|---|---|---|
| θ (degrees) | 18.5 | tc (%) | 1.33 |
| Rmax (mm) | 0.830 | EFL (mm) | 3.74 |
| Rmin (mm) | 0.819 | EFL/(2 × Rmin) | 2.3 |
| t (mm) | 0.011 | | |

Moreover, when the lens holding member 220 includes the radius structures 225, an equivalent number of the light-blocking structures 221 is defined as N' by the minimum radius Rmin of the light passing hole 2201, wherein N'=360°/θ, and N'≠N. In the 2nd example of the 2nd embodiment, N'=19.46.

Please refer to FIG. 2O, FIG. 2O is a schematic view of the light-blocking structures 221 disposed on a lens holding member of an imaging lens assembly of the 3rd example according to the 2nd embodiment of the present disclosure. Only the differences between the imaging lens assembly of the 3rd example of the 2nd embodiment and the imaging lens assembly 200 of the 1st example of the 2nd embodiment will be described below, and the others of the same element structures and the technical features thereof will not be repeated herein. In FIG. 2O, the lens holding member includes a plurality of light-blocking structures 221, each of the light-blocking structures 221 is a straight-line shape and has two end points 2211 and one central point 2212, and the central point 2212 is closer to the optical axis than each of the two end points 2211 to the optical axis. Specifically, two adjacent end points 2211 of any adjacent two light-blocking structures 221, respectively, are connected to each other, so that the light-blocking structures 221 surround the optical axis and form the light passing hole 2201 shaped as a polygon. In the 3rd example of the 2nd embodiment, a total number of the light-blocking structures 221 is N and N is 34, that is, the light passing hole 2201 is a 34-sided polygon and also a regular polygon.

In the 3rd example of the 2nd embodiment, a maximum radius of the light passing hole 2201 is defined as Rmax, and a minimum radius of the light passing hole 2201 is defined as Rmin. There is an angle being θ between two connecting lines from the two end points 2211, respectively, of each of the light-blocking structures 221 to the optical axis, and a focal length of the imaging lens assembly 200 is EFL. The light passing hole 2201 has a circularity tolerance value being t and a circularity coefficient being tc, wherein t=Rmax−Rmin, and tc=t/Rmax×100%. The parameters mentioned above satisfy the values in Table 2C.

13

TABLE 2C

| the 3rd example of the 2nd embodiment | | | |
|---|---|---|---|
| θ (degrees) | 10.59 | tc (%) | 0.48 |
| Rmax (mm) | 0.830 | EFL (mm) | 3.74 |
| Rmin (mm) | 0.826 | EFL/(2 × Rmin) | 2.3 |
| t (mm) | 0.004 | | |

3rd Embodiment

Figure 3A:
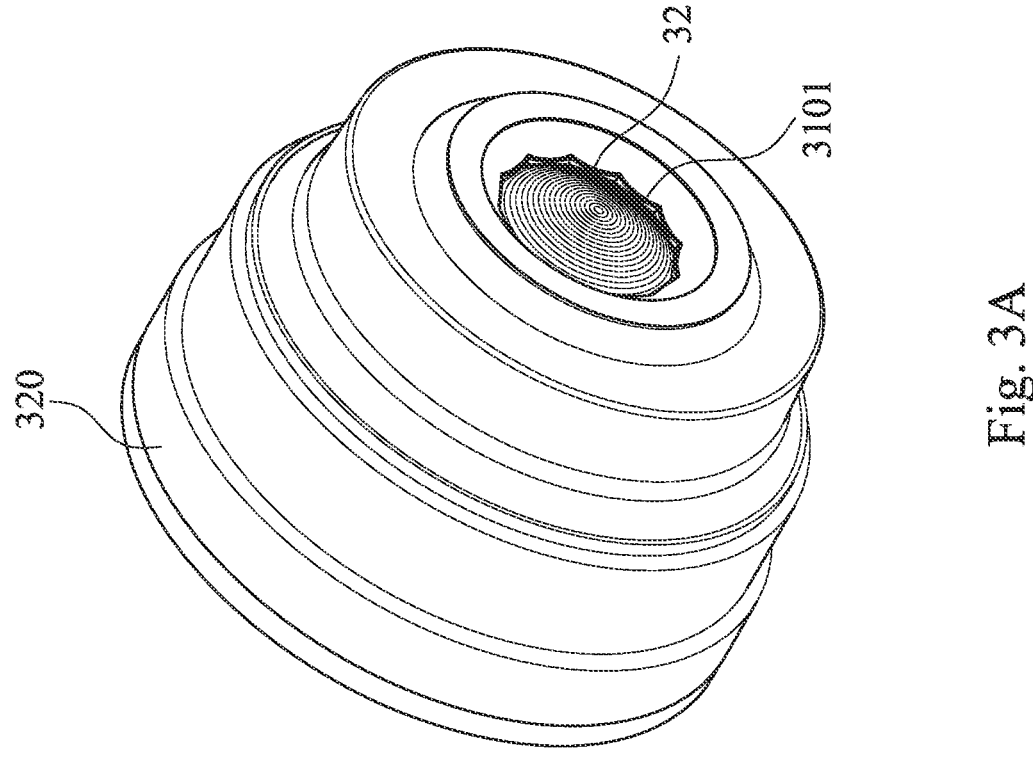
FIG. 3A is a three-dimensional view of an imaging lens assembly of the 1st example according to the 3rd embodiment of the present disclosure.
Figure 3B:
FIG. 3B is an exploded view of the imaging lens assembly in FIG. 3A.
Figure 3C:
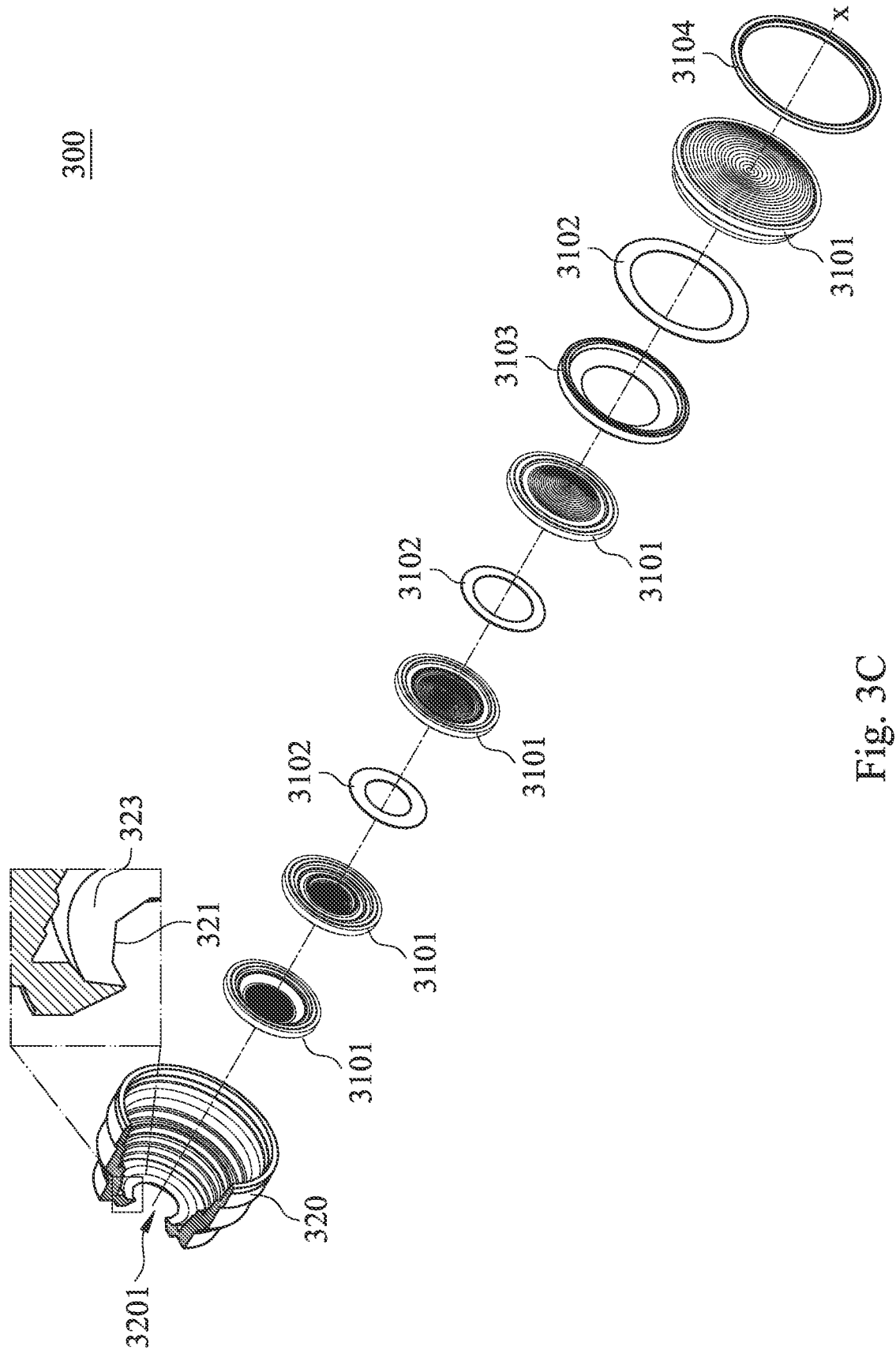
FIG. 3C is another exploded view of the imaging lens assembly in FIG. 3A.
Figure 3E:
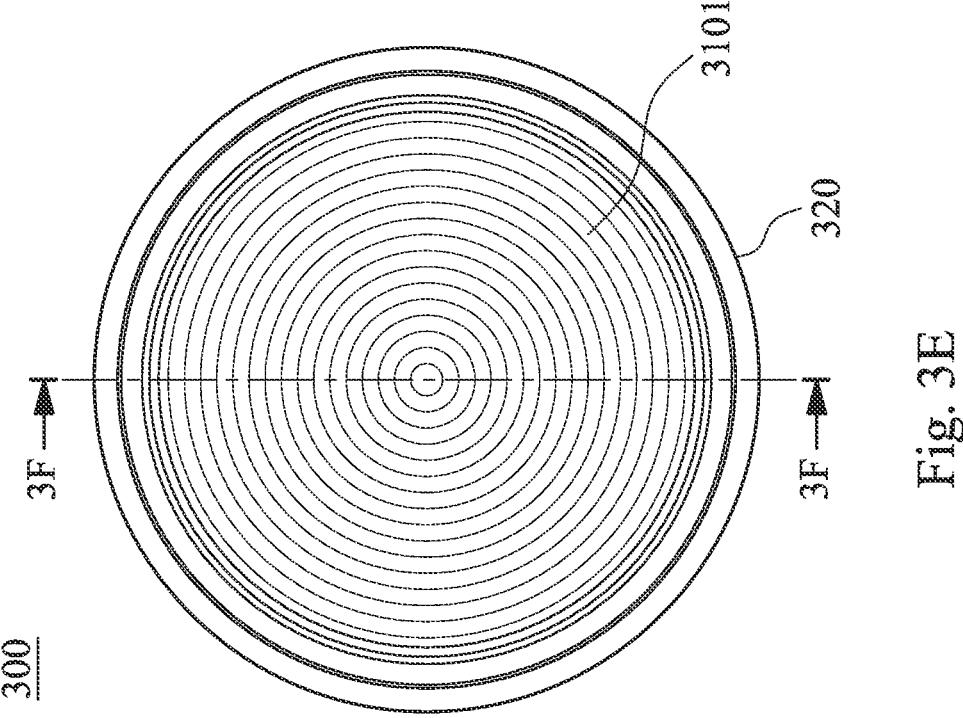
FIG. 3E is a schematic view of an image side of the imaging lens assembly in FIG. 3A.
Figure 3D:
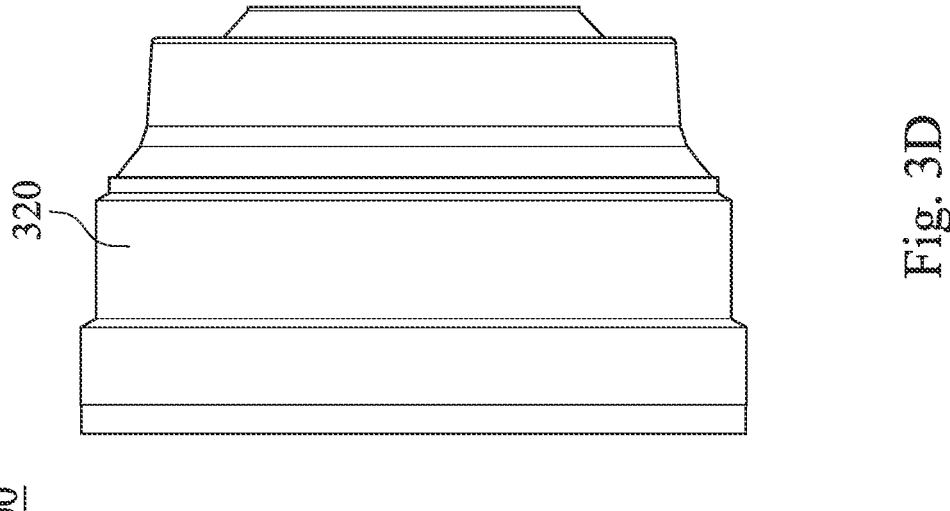
FIG. 3D is a lateral view of the imaging lens assembly in FIG. 3A.
Figures 3F, 3G:
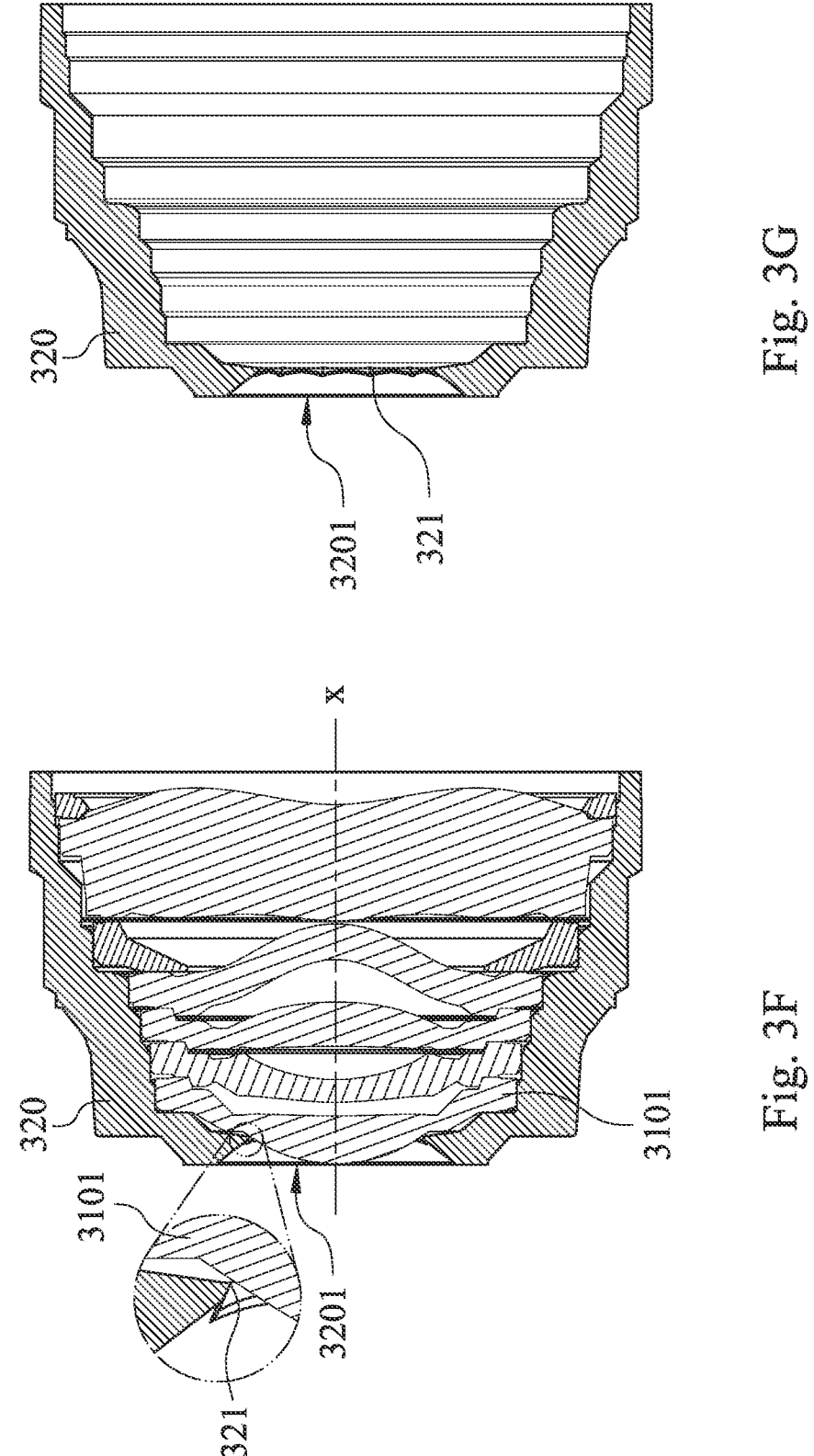
FIG. 3F is a sectional view of FIG. 3E taken along a line 3F-3F.
FIG. 3G is a sectional view of a lens holding member in FIG. 3E taken along the line 3F-3F.

Please refer to FIGS. 3A to 3F, wherein FIG. 3A is a three-dimensional view of an imaging lens assembly 300 of the 1st example according to the 3rd embodiment of the present disclosure, FIG. 3B is an exploded view of the imaging lens assembly 300 in FIG. 3A, FIG. 3C is another exploded view of the imaging lens assembly 300 in FIG. 3A, FIG. 3D is a lateral view of the imaging lens assembly 300 in FIG. 3A, FIG. 3E is a schematic view of an image side of the imaging lens assembly 300 in FIG. 3A, and FIG. 3F is a sectional view of FIG. 3E taken along a line 3F-3F. In FIGS. 3A to 3F, the imaging lens assembly 300 has an optical axis X and includes an imaging lens set (its reference numeral is omitted) and a lens holding member 320. The optical axis X passes through the imaging lens set, and the lens holding member 320 accommodates the imaging lens set for aligning the imaging lens set with the optical axis X. In detail, in the 1st example of the 3rd embodiment, the imaging lens set includes five optical lens elements 3101, and the optical lens elements 3101 are disposed in the lens holding member 320 along the optical axis X with other optical elements. Specifically, from an object side to an image side of the imaging lens assembly 300, the lens holding member 320 accommodates two optical lens elements 3101, a light-blocking sheet 3102, an optical lens element 3101, a light-blocking sheet 3102, an optical lens element 3101, a spacer 3103, a light-blocking sheet 3102, an optical lens element 3101, and a retainer 3104.

Figure 3H:
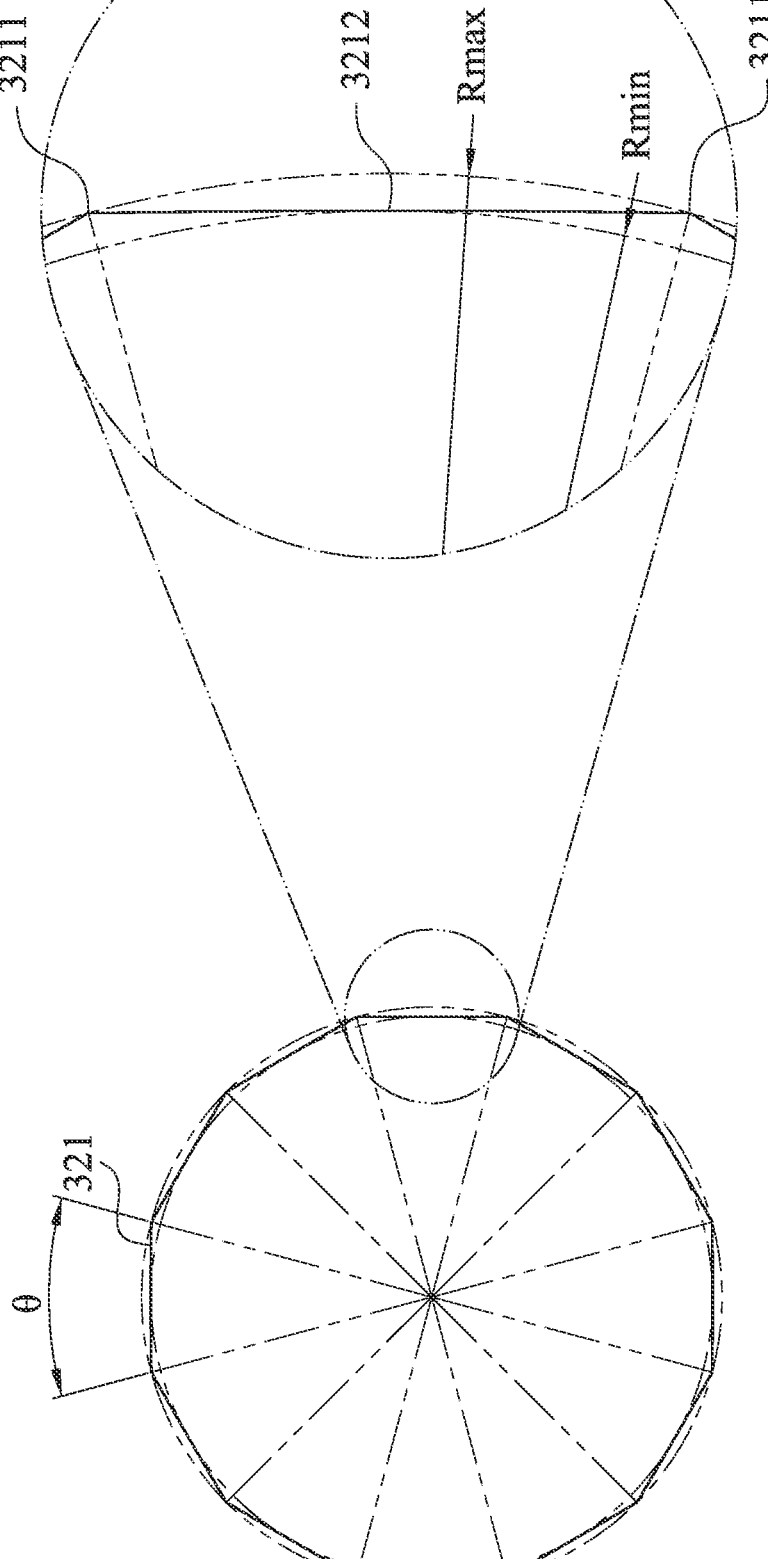
FIG. 3H is a schematic view of a plurality of light-blocking structures disposed on the lens holding member in FIG. 3B.
Figure 31:
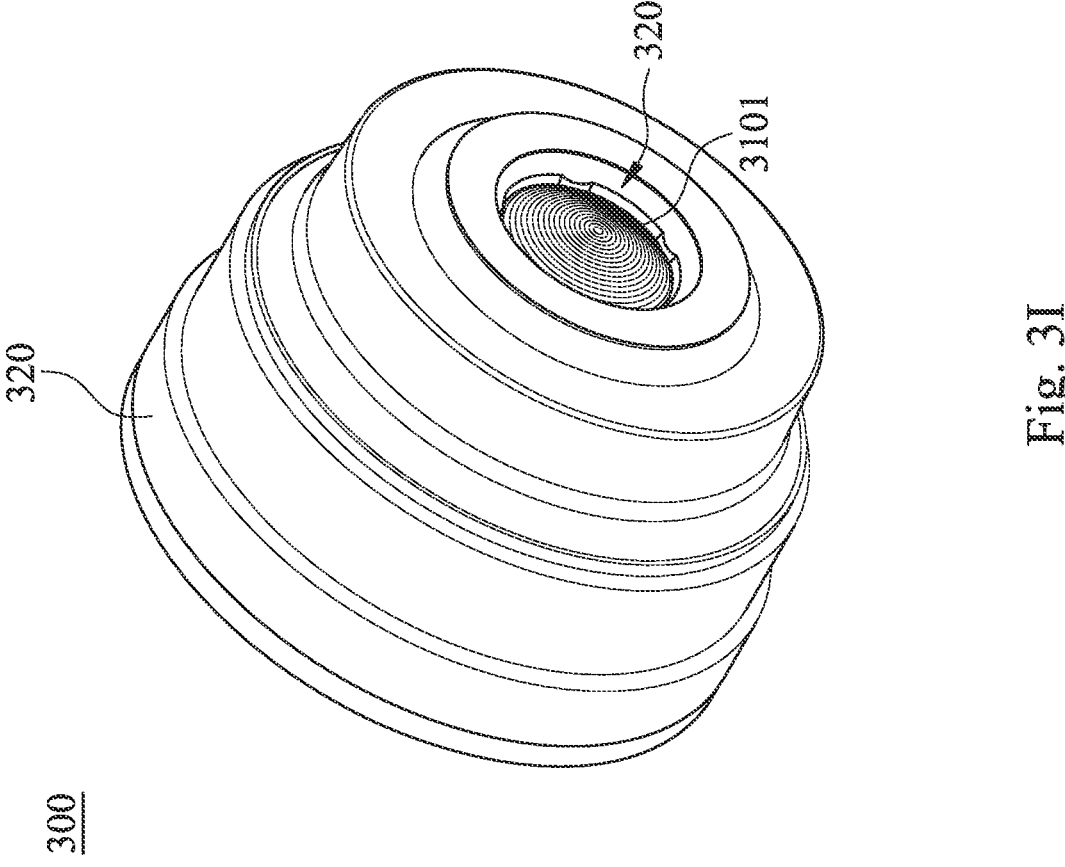

Please refer to FIGS. 3G and 3H, wherein FIG. 3G is a sectional view of a lens holding member 320 in FIG. 3E taken along the line 3F-3F, and FIG. 3H is a schematic view of a plurality of light-blocking structures 321 disposed on the lens holding member 320 in FIG. 3B. In FIGS. 3B, 3C, and 3G, the lens holding member 320 includes the plurality of light-blocking structures 321, the light-blocking structures 321 are disposed on an object side of the imaging lens set and surround the optical axis X for forming a light passing hole 3201, and the lens holding member 320 and the light-blocking structures 321 are formed integrally. In the 1st example of the 3rd embodiment, the light passing hole 3201 is an aperture of the imaging lens assembly 300 for controlling an amount of incident light of the imaging lens assembly 300. Each of the light-blocking structures 321 is formed by connecting and intersecting a first tapered surface 322 and a second tapered surface 323, wherein the first tapered surface 322 faces toward the object side of the imaging lens assembly 300 and tapers toward the image side of the imaging lens assembly 300, and the second tapered surface 323 faces toward the image side of the imaging lens assembly 300 and tapers toward the object side of the imaging lens assembly 300. That is, the first tapered surface 322 and the second tapered surface 323 taper toward the optical axis X from the object side to the image side of the imaging lens assembly 300 and from the image side to the object side of the imaging lens assembly 300, respectively, and form each of the light-blocking structures 321 with a taper shape.

In FIG. 3H, each of the light-blocking structures 321 is a straight-line shape and has two end points 3211 and one central point 3212, wherein the central point 3212 is closer to the optical axis X than each of the end points 3211 thereto. Specifically, two adjacent end points 3211 of any adjacent two light-blocking structures 321, respectively, are connected to each other, so that the light-blocking structures 321 surround the optical axis X and form the light passing hole 3201 shaped as a polygon. In the 1st example of the 3rd embodiment, a total number of the light-blocking structures 321 is N and N is 12. That is, the light passing hole 3201 is a 12-sided polygon and also a regular polygon.

With reference to FIG. 3F, there is no contact between the light-blocking structures 321 and the optical lens element 3101 which is closest to the object side, that is, there is no contact between the light-blocking structures 321 and the imaging lens set. Furthermore, each of the light-blocking structures 321 overlaps with the imaging lens set along a direction parallel to the optical axis X.

With reference to FIG. 3H, a maximum radius of the light passing hole 3201 is defined as Rmax by a position near each of the two end points 3211 of each of the light-blocking structures 321, and a minimum radius of the light passing hole 3201 is defined as Rmin by a position near the central point 3212 of each of the light-blocking structures 321, which is closest to the optical axis X. There is an angle being θ between two connecting lines from the two end points 3211, respectively, of each of the light-blocking structures 321 to the optical axis X, and a focal length of the imaging lens assembly 300 is EFL. The light passing hole 3201 has a circularity tolerance value being t and a circularity coefficient being tc, wherein t=Rmax−Rmin, and tc=t/Rmax× 100%. The parameters mentioned above satisfy the values in Table 3A.

TABLE 3A

| the 1st example of the 3rd embodiment | | | |
|---|---|---|---|
| θ (degrees) | 30 | tc (%) | 3.21 |
| Rmax (mm) | 0.935 | EFL (mm) | 4.16 |
| Rmin (mm) | 0.905 | EFL/(2 × Rmin) | 2.3 |
| t (mm) | 0.03 | | |

Figure 3K:
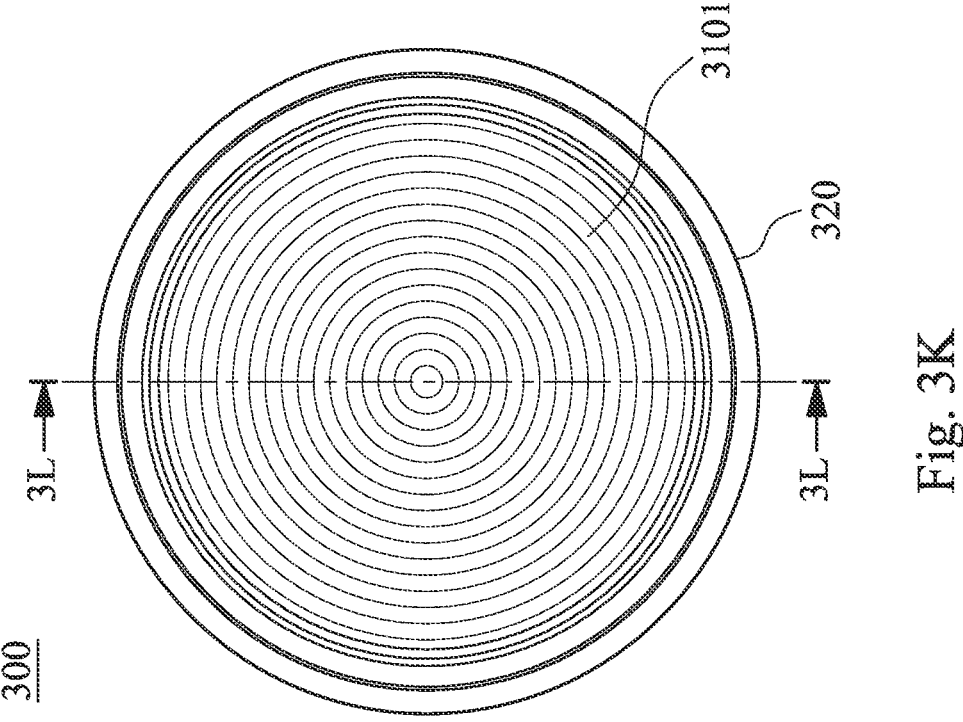
FIG. 3K is a schematic view of an image side of the imaging lens assembly in FIG. 3I.
Figure 3J:
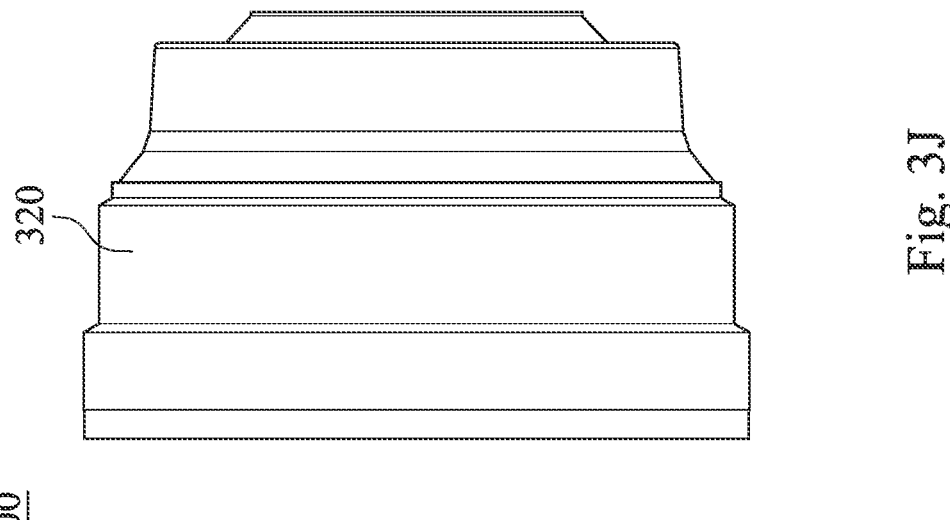
FIG. 3J is a lateral view of the imaging lens assembly in FIG. 3I.
Figures 3L, 3M:
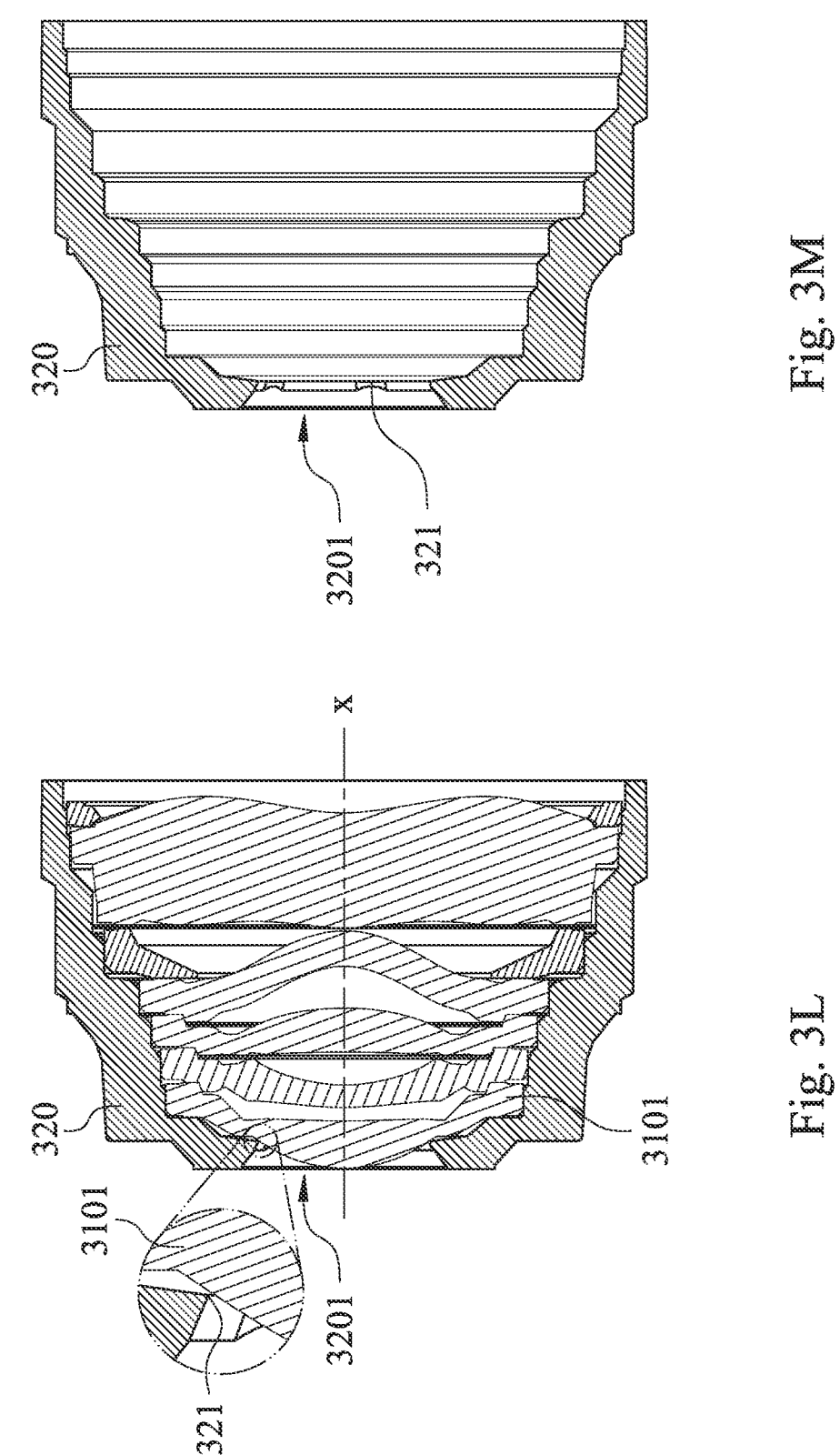
FIG. 3L is a sectional view of FIG. 3K taken along a line 3L-3L.
FIG. 3M is a sectional view of a lens holding member in FIG. 3K taken along the line 3L-3L.

Please refer to FIGS. 3I to 3L, wherein FIG. 3I is a three-dimensional view of an imaging lens assembly 300 of the 2nd example according to the 3rd embodiment of the present disclosure, FIG. 3J is a lateral view of the imaging lens assembly 300 in FIG. 3I, FIG. 3K is a schematic view of an image side of the imaging lens assembly 300 in FIG. 3I, and FIG. 3L is a sectional view of FIG. 3K taken along a line 3L-3L. In FIGS. 3I to 3L, the imaging lens assembly 300 of the 2nd example of the 3rd embodiment has an optical axis X and includes an imaging lens set (its reference numeral is omitted) and a lens holding member 320. Only the differences between the imaging lens assembly 300 of the 2nd example of the 3rd embodiment and the imaging lens assembly 300 of the 1st example of the 3rd embodiment will be described below, and the others of the same element structures and the technical features thereof will not be repeated herein.

Figure 3N:
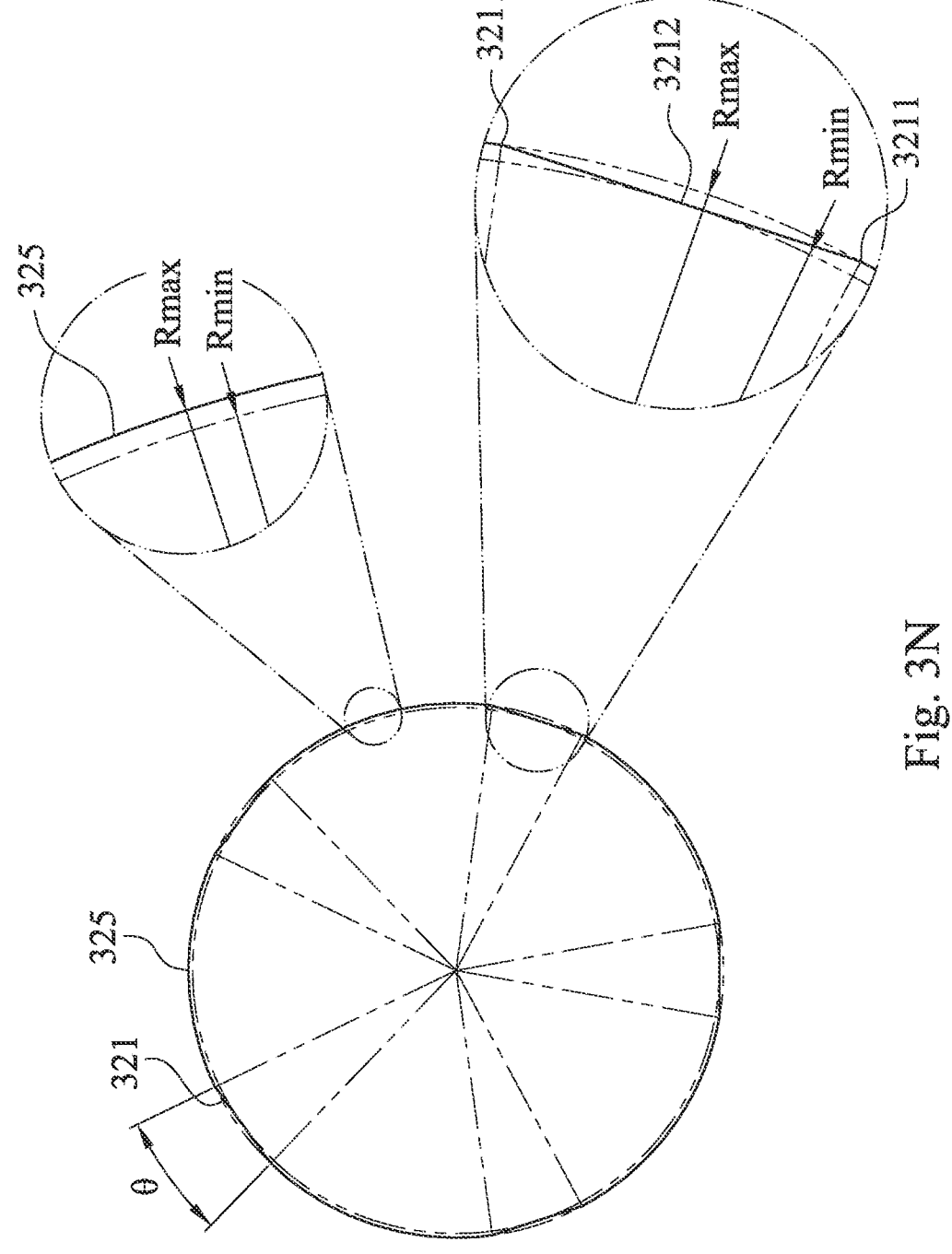
FIG. 3N is a schematic view of a plurality of light-blocking structures and a plurality of radius structures disposed on the lens holding member in FIG. 3I.
Figure 30:
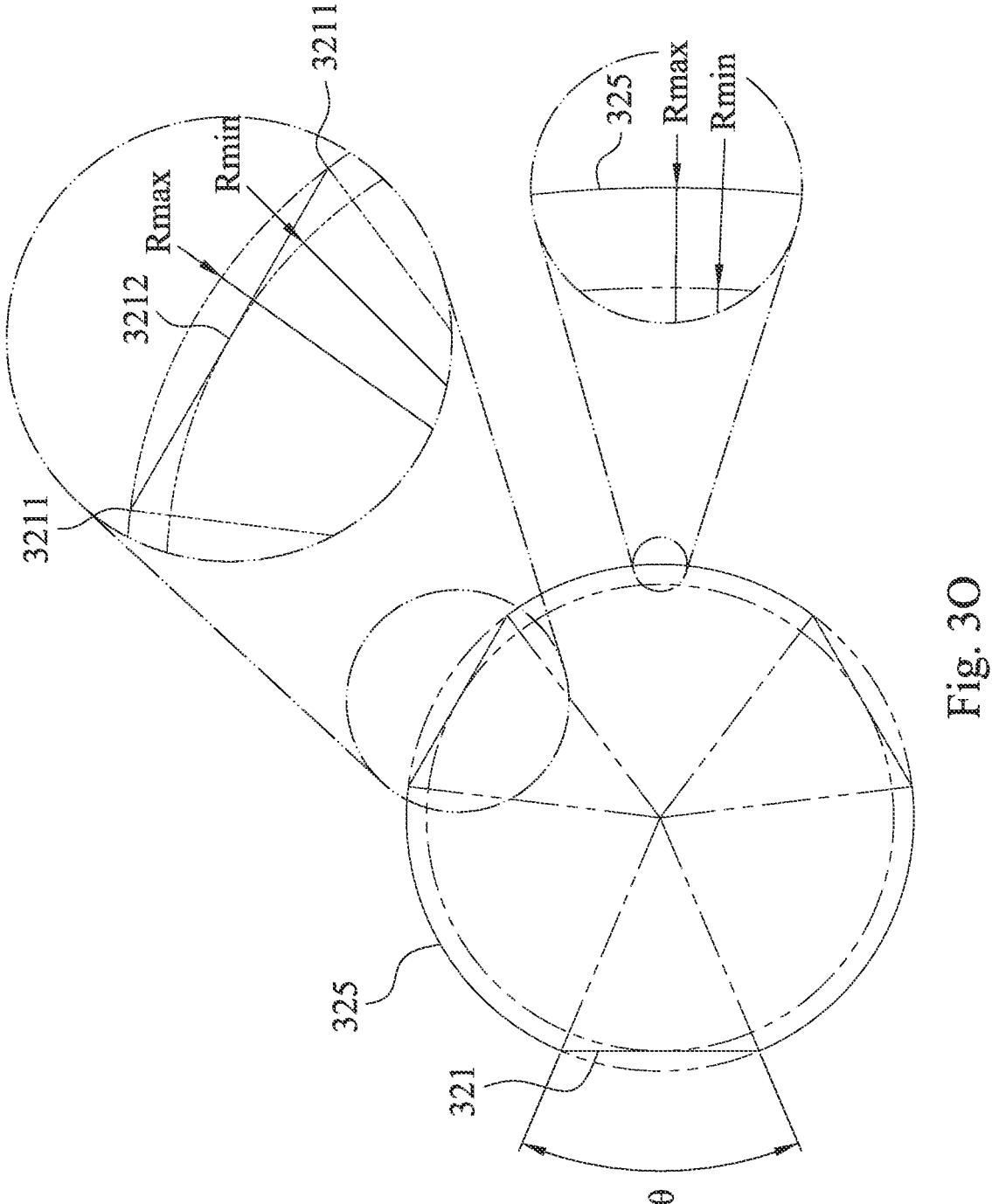

Please refer to FIGS. 3M and 3N, wherein FIG. 3M is a sectional view of a lens holding member 320 in FIG. 3K taken along the line 3L-3L, and FIG. 3N is a schematic view of the light-blocking structures 321 and a plurality of radius structures 325 disposed on the lens holding member 320 in FIG. 3I. In FIGS. 3I, 3M, and 3N, the lens holding member 320 includes the plurality of light-blocking structures 321 and a plurality of radius structures 325, the light-blocking structures 321 and the radius structures 325 are disposed on an object side of the imaging lens set and alternatively connect to each other, and surround the optical axis X for forming a light passing hole 3201. The lens holding member 320, the light-blocking structures 321, and the radius structures 325 are formed integrally. In the 2nd example of the 3rd embodiment, the light passing hole 3201 is an aperture of the imaging lens assembly 300 for controlling an amount of incident light of the imaging lens assembly 300. A total number of the light-blocking structures 321 is 5, and a number of the radius structures 325 is 5.

In detail, each of the light-blocking structures 321 is a straight-line shape and has two end points 3211 and one central point 3212, and the central point 3212 is closer to the optical axis X than each of the two end points 3211 to the optical axis X. Each of the radius structures 325 is connected to two end points 3211 of adjacent two of the light-blocking structures 321, respectively. It should be noted that, each of the radius structures 325 are arc-shaped, a maximum radius of the light passing hole 3201 is defined as Rmax by a position near each of the two end points 3211 of each of the light-blocking structures 321, and a radius of the radius structures 325 is the maximum radius Rmax of the light passing hole 3201.

In FIG. 3N, the maximum radius of the light passing hole 3201 is Rmax, a minimum radius of the light passing hole 3201 is Rmin, there is an angle being θ between two connecting lines from the two end points 3211, respectively, of each of the light-blocking structures 321 to the optical axis X, and a focal length of the imaging lens assembly 300 is EFL. The light passing hole 3201 has a circularity tolerance value being t and a circularity coefficient being tc, wherein t=Rmax−Rmin, and tc=t/Rmax×100%. The parameters mentioned above satisfy the values in Table 3B.

TABLE 3B

| the 2nd example of the 3rd embodiment | | | |
| --- | --- | --- | --- |
| θ (degrees) | 20.34 | tc (%) | 1.60 |
| Rmax (mm) | 0.935 | EFL (mm) | 4.16 |
| Rmin (mm) | 0.920 | EFL/(2 × Rmin) | 2.3 |
| t (mm) | 0.015 | | |

Moreover, when the lens holding member 320 includes the radius structures 325, an equivalent number of the light-blocking structures 321 is defined as N' by the minimum radius Rmin of the light passing hole 3201, wherein N'=360°/θ, and N'≠N. In the 2nd example of the 3rd embodiment, N'=17.7.

Please refer to FIG. 3O, FIG. 3O is a schematic view of a plurality of light-blocking structures 321 and a plurality of radius structures 325 disposed on a lens holding member of an imaging lens assembly of the 3rd example according to the 3rd embodiment of the present disclosure. Only the differences between the imaging lens assembly of the 3rd example of the 3rd embodiment and the imaging lens assembly 300 of the 1st example of the 3rd embodiment will be described below, and the others of the same element structures and the technical features thereof will not be repeated herein. In FIG. 3O, the lens holding member includes the plurality of light-blocking structures 321 and the plurality of radius structures 325. The light-blocking structures 321 and the radius structures 325 are disposed on an object side of the imaging lens set and alternatively connect to each other, and surround the optical axis for forming a light passing hole. The lens holding member, the light-blocking structures 321, and the radius structures 325 are formed integrally. In the 3rd example of the 3rd embodiment, a total number of the light-blocking structures 321 is 3, and a total number of the radius structures 325 is 3.

In detail, each of the light-blocking structures 321 is a straight-line shape and has two end points 3211 and one central point 3212, and the central point 3212 is closer to the optical axis than each of the two end points 3211 to the optical axis. Each of the radius structures 325 is connected to two end points 3211 of adjacent two of the light-blocking structures 321, respectively. It should be noted that, each of the radius structures 325 are arc-shaped, a maximum radius of the light passing hole is defined as Rmax by a position near each of the two end points 3211 of each of the light-blocking structures 321, and a radius of the radius structures 325 is the maximum radius Rmax of the light passing hole.

The maximum radius of the light passing hole is defined as Rmax, and a minimum radius of the light passing hole is defined as Rmin. There is an angle being θ between two connecting lines from the two end points 3211, respectively, of each of the light-blocking structures 321 to the optical axis, and a focal length of the imaging lens assembly 300 is EFL. The light passing hole has a circularity tolerance value being t and a circularity coefficient being tc, wherein t=Rmax−Rmin, and tc=t/Rmax×100%. The parameters mentioned above satisfy the values in Table 3C.

TABLE 3C

| the 3rd example of the 3rd embodiment | | | |
| --- | --- | --- | --- |
| θ (degrees | 45.9 | tc (%) | 7.91 |
| Rmax (mm) | 0.935 | EFL (mm) | 4.16 |
| Rmin (mm) | 0.861 | EFL/(2 × Rmin) | 2.4 |
| t (mm) | 0.074 | | |

Moreover, when the lens holding member includes the radius structures 325, an equivalent number of the light-blocking structures 321 is defined as N' by the minimum radius Rmin of the light passing hole 3201, wherein N'=360°/θ, and N'≠N. In the 3rd example of the 3rd embodiment, N'=7.8.

4th Embodiment

Figure 4A:
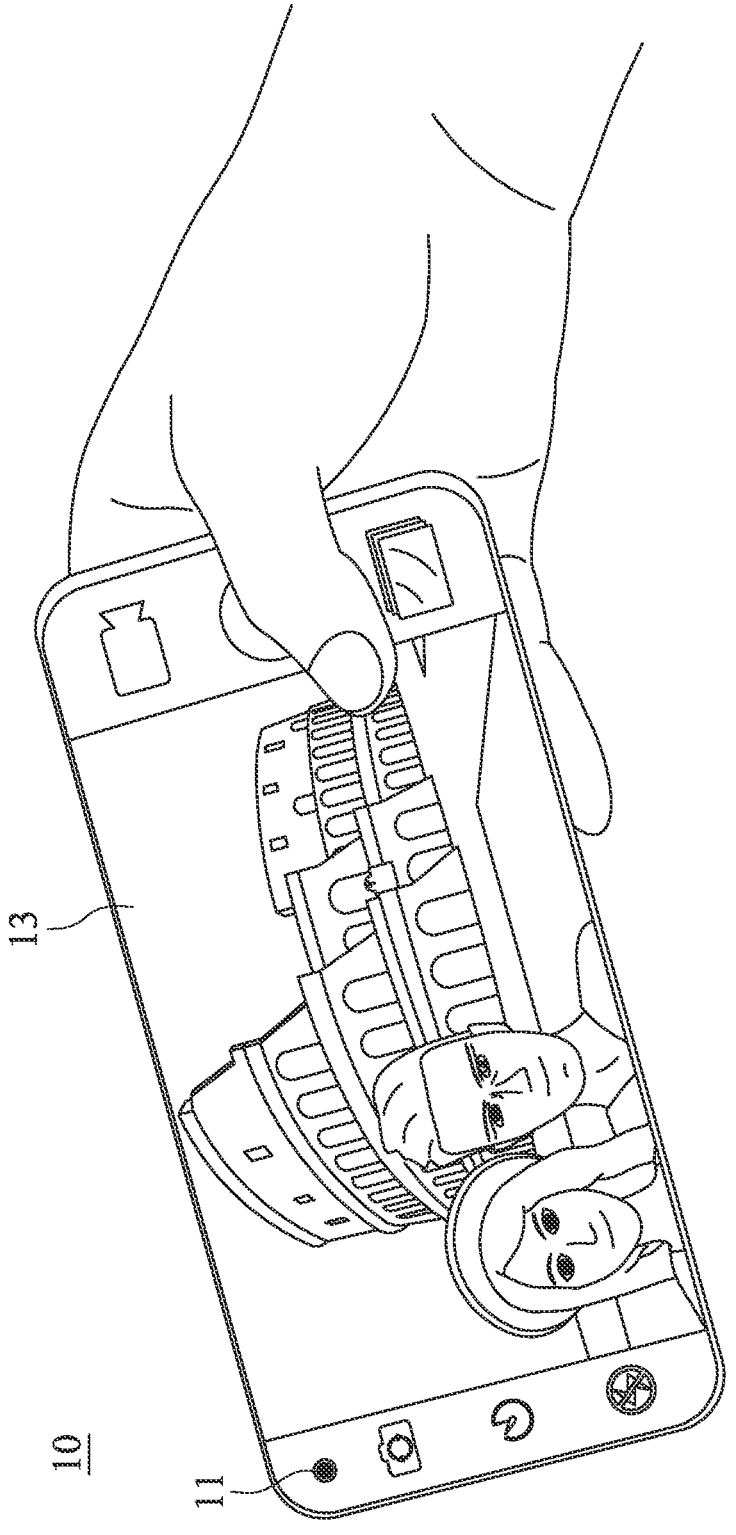
FIG. 4A is a schematic view of an electronic device of an example according to the 4th embodiment of the present disclosure.
Figure 4B:
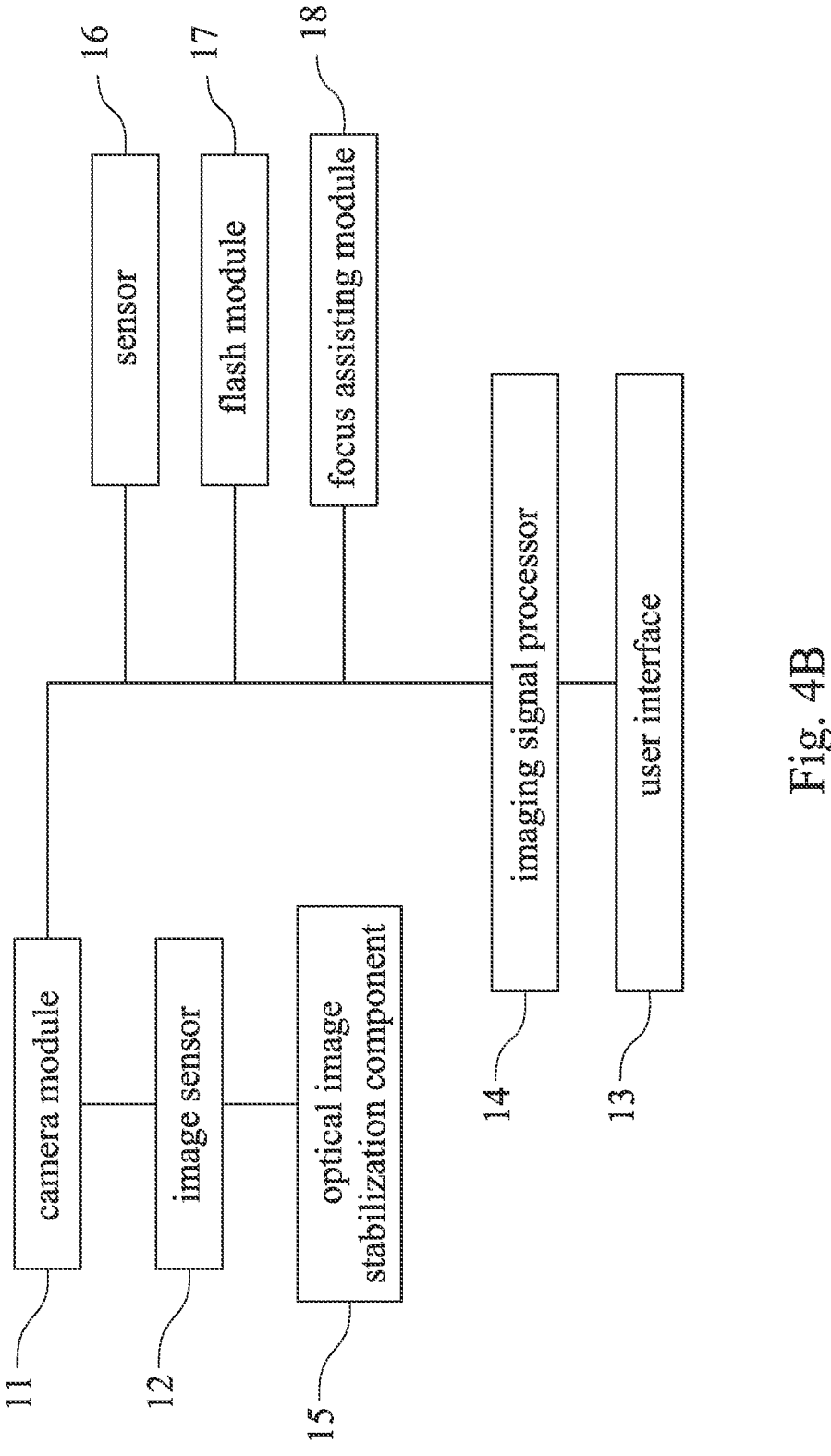
FIG. 4B is a block diagram of the electronic device in FIG. 4A.

FIG. 4A is a schematic view of an electronic device 10 of an example according to the 4th embodiment of the present disclosure, and FIG. 4B is a block diagram of the electronic device 10 in FIG. 4A. In FIGS. 4A and 4B, the electronic device 10 is a smartphone and includes a camera module 11, an image sensor 12, and a user interface 13, wherein image sensor 12 is disposed on an image surface of the camera module 11, and the camera module 11 includes an imaging lens assembly (not shown). The camera module 11 is disposed on a peripheral area of the user interface 13, wherein the user interface 13 can be a touch screen or a display screen, but it is not limited thereto. The imaging lens assembly of the camera module 11 can be any aforementioned imaging lens assembly described in the examples of the 1st embodiment to the 3rd embodiment, but it is not limited thereto.

Furthermore, a user enters the shooting mode through the user interface 13. At this time, the camera module 11 collects the imaging light onto the image sensor 12 and outputs an electronic signal related to the image to an image signal processor (ISP) 14.

In response to a camera specification of the electronic device 10, the electronic device 10 can further include an optical image stabilization component 15, which can be an OIS anti-shake feedback device. Furthermore, the electronic device 10 can further include at least one auxiliary optical element (its reference numeral is omitted) and at least one sensor 16. In the 4th embodiment, the auxiliary optical elements are a flash module 17 and a focus assisting module 18, the flash module 17 is for compensating the color temperature, and the focus assisting module 18 can be an infrared ranging element, a laser focusing module, etc. The sensor 16 can have the function of sensing physical momentum and actuation energy, such as an accelerometer, a gyroscope, and a Hall Effect Element, so as to sense the shaking and the shaking imposed by the user's hand or the external environment, which is beneficial for the auto-focusing function and the optical image stabilization component 15 configured in the camera module 11 of the electronic device 10 to obtain good optical quality and is helpful for the electronic device 10 of the present disclosure to be equipped with multiple modes of shooting function, such as optimized selfie, low-light High Dynamic Range (HDR), a high-resolution 4K (4K Resolution) video recording, etc. Moreover, the user can directly see the shot of the camera through the touch screen, and manually operate the framing range on the touch screen, so as to achieve the autofocus function of what you see is what you get.

Furthermore, electronic device 10 can further include but not limit to a display, a control unit, a storage unit, a random access memory (RAM), a read-only memory (ROM), or a combination thereof.

Figure 4C:
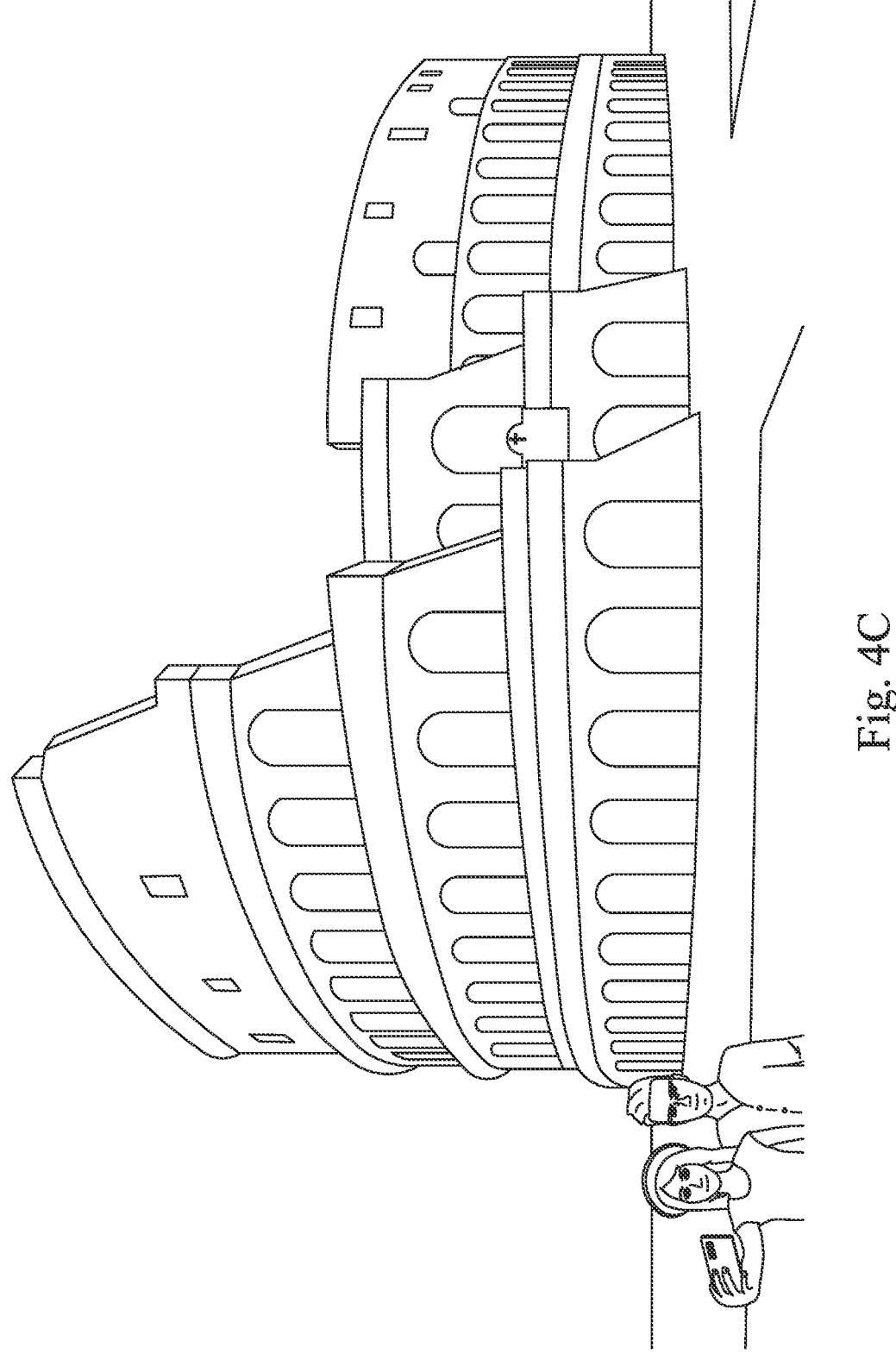
FIG. 4C is a schematic view of a selfie scene according to the example in FIG. 4A.
Figure 4D:
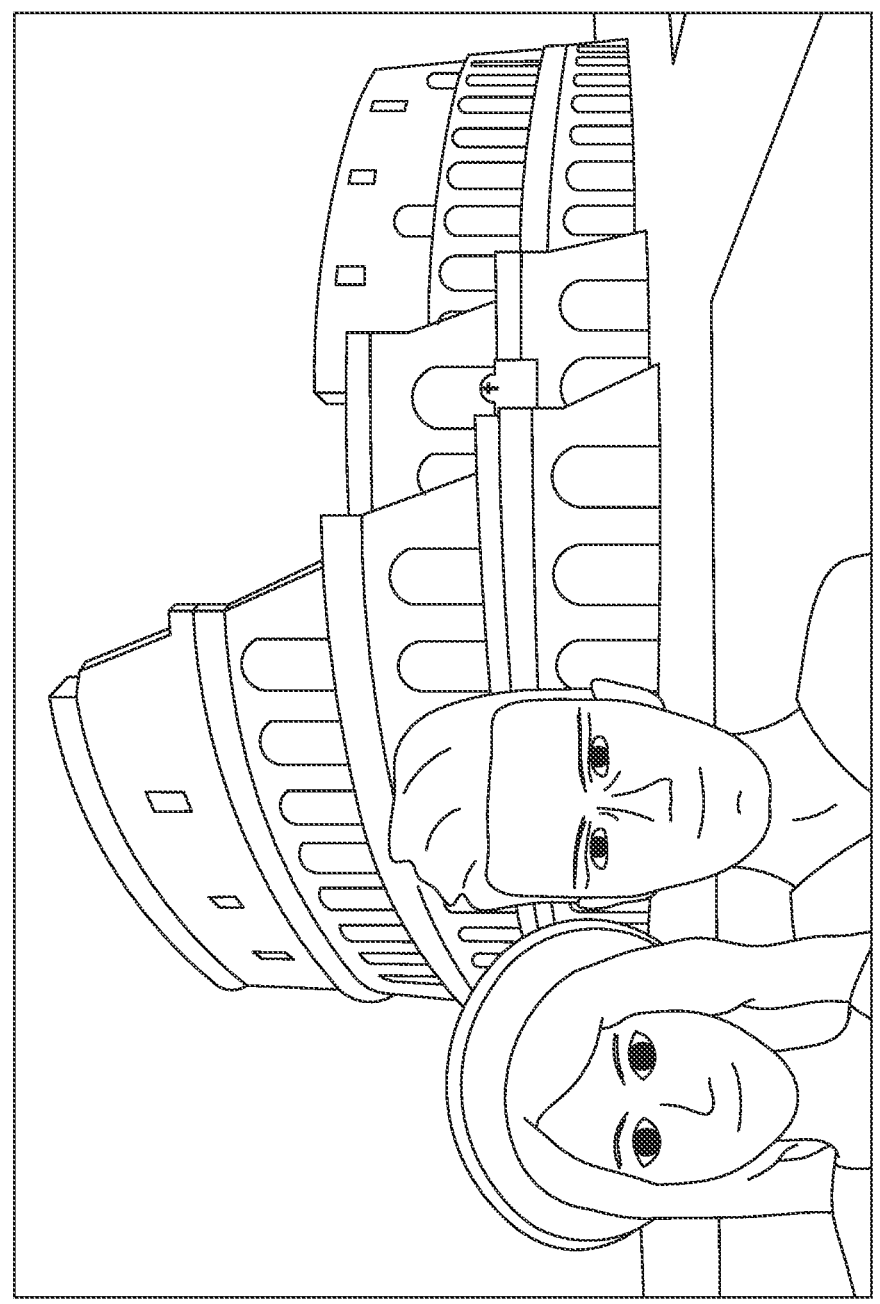
FIG. 4D is a schematic view of an image captured by the example in FIG. 4A.

FIG. 4C is a schematic view of a selfie scene according to the example in FIG. 4A, and FIG. 4D is a schematic view of an image captured by the example in FIG. 4A. In FIGS. 4A, 4C, and 4D, both the camera module 11 and the user interface 13 are toward the user, when taking a selfie or live streaming, the user can view the captured image and operate the interface at the same time, and get an image as shown in FIG. 4D after shooting. Therefore, shooting with the camera module 11 of the present disclosure can provide users a better shooting experience.

The foregoing description, for purpose of explanation, has been described with reference to specific examples. It is to be noted that Tables show different data of the different examples; however, the data of the different examples are obtained from experiments. The examples were chosen and described in order to best explain the principles of the disclosure and its practical applications, to thereby enable others skilled in the art to best utilize the disclosure and various examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly, having an optical axis, comprising:
   an imaging lens set, the optical axis passing through the imaging lens set; and
   a lens holding member accommodating the imaging lens set for aligning the imaging lens set with the optical axis, and comprising:
      a plurality of light-blocking structures disposed on an object side of the imaging lens set and surrounding the optical axis for forming a light passing hole;

wherein each of the light-blocking structures is a straight-line shape and has two end points and one central point, the central point is closer to the optical axis than each of the two end points to the optical axis on each of the light-blocking structures, a maximum radius of the light passing hole is defined as Rmax by a position near each of the two end points of each of the light-blocking structures, and a minimum radius of the light passing hole is defined as Rmin by a position near the central point of each of the light-blocking structures, which is closest to the optical axis;
      wherein a total number of the light-blocking structures is N, and the following condition is satisfied:

$$3 \leq N < 40;$$

wherein the lens holding member further comprises a plurality of radius structures, wherein each of the radius structures is an arc-shaped structure between two adjacent light-blocking structures, and each of the radius structures is connected to one of the two end points of an adjacent one of the light-blocking structures.

2. The imaging lens assembly of claim 1, wherein the lens holding member and the light-blocking structures are formed integrally.

3. The imaging lens assembly of claim 2, wherein there is no contact between the light-blocking structures and the imaging lens set.

4. The imaging lens assembly of claim 3, wherein when the total number of the light-blocking structures is between 7 and 22, the light passing hole has a circularity tolerance value being t and a circularity coefficient being tc, and the following conditions are satisfied:

$$0.01 < t < 0.08; \text{ and}$$

$$1.02\% < tc < 9.90\%;$$

wherein t=Rmax-Rmin; and tc=t/Rmax×100%.

5. The imaging lens assembly of claim 4, wherein the circularity coefficient of the light passing hole is tc, and the following condition is satisfied:

$$1.12\% < tc < 8.05\%.$$

6. The imaging lens assembly of claim 1, wherein there is an angle being θ between two connecting lines from the two end points, respectively, of each of the light-blocking structures to the optical axis.

7. The imaging lens assembly of claim 6, wherein the minimum radius of the light passing hole defined as Rmin is for defining an equivalent number of the light-blocking structures as N', the light passing hole has a circularity tolerance value being t and a circularity coefficient being tc, and the following conditions are satisfied:

$$N' = 360°/\theta;$$

$$7 < N' < 22;$$

$$0.01 < t < 0.08; \text{ and}$$

$$1.02\% < tc < 9.90\%;$$

wherein N'≠N, t=Rmax−Rmin, and tc=t/Rmax×100%.

8. The imaging lens assembly of claim 7, wherein the circularity coefficient of the light passing hole is tc, and the following condition is satisfied:

$$1.12\% < tc < 8.05\%.$$

9. The imaging lens assembly of claim 3, wherein each of the light-blocking structures is formed by connecting and intersecting a first tapered surface and a second tapered surface.

10. The imaging lens assembly of claim 9, wherein the first tapered surface faces toward an object side of the imaging lens assembly and tapers toward an image side of the imaging lens assembly.

11. The imaging lens assembly of claim 10, wherein the second tapered surface faces toward the image side of the imaging lens assembly and tapers toward the object side of the imaging lens assembly.

12. The imaging lens assembly of claim 3, wherein each of the light-blocking structures overlaps with the imaging lens set along a direction parallel to the optical axis.

13. The imaging lens assembly of claim 12, wherein the light passing hole is an aperture of the imaging lens assembly for controlling an amount of incident light of the imaging lens assembly.

14. The imaging lens assembly of claim 13, wherein a focal length of the imaging lens assembly is EFL, and the following condition is satisfied:

$$1.0 < EFL/(2 \times Rmin) < 3.0.$$

15. The imaging lens assembly of claim 3, wherein the light passing hole is shaped as an N-sided polygon.

16. The imaging lens assembly of claim 3, wherein the light passing hole is shaped as a regular polygon.

17. The imaging lens assembly of claim 3, wherein the lens holding member has at least two gate marks.

18. A camera module, comprising:
the imaging lens assembly of claim 1.

19. An electronic device, comprising:
the camera module of claim 18; and
an image sensor disposed on an image surface of the camera module.

\*    \*    \*    \*    \*